United States Patent [19]

Nishiyama et al.

[11] Patent Number: 4,907,100

[45] Date of Patent: Mar. 6, 1990

[54] READOUT CIRCUIT IN MAGNETIC RECORDING DEVICE

[75] Inventors: Nobumasa Nishiyama, Hachioji; Makoto Saito, Tokyo; Yasuhide Ouchi, Koganei; Yasuhiro Katoh, Tokyo; Yoshihasa Kamo, Kokubunji; Makoto Koizumi, Hachioji; Hajime Aoi, Tachikawa; Naoki Sato, Hachioji; Reijiro Tsuchiya, Kokubunji, all of Japan

[73] Assignee: Hitachi, Ltd., Tokyo, Japan

[21] Appl. No.: 248,123

[22] Filed: Sep. 23, 1988

[30] Foreign Application Priority Data

Sep. 24, 1987 [JP] Japan .................................. 62-237129
Dec. 21, 1987 [JP] Japan .................................. 62-321210
Dec. 21, 1987 [JP] Japan .................................. 62-321223

[51] Int. Cl.$^4$ ................................................. G11B 5/09
[52] U.S. Cl. ........................................ 360/45; 360/48
[58] Field of Search .................... 360/65, 46, 45, 67

[56] References Cited

U.S. PATENT DOCUMENTS 4,590,524 5/1986 Okamoto et al. ..................... 360/65

FOREIGN PATENT DOCUMENTS 55-105495 2/1982 Japan .................................... 360/65

Primary Examiner—Vincent P. Canney
Attorney, Agent, or Firm—Antonelli, Terry & Wands

[57] ABSTRACT

A readout circuit in magnetic recording device is disclosed, in which a test data signal for detecting an error in the characteristics of an automatic equalizer is recorded in a predetermined position of each track of a magnetic recording medium. In readout mode, a test data signal for a selected track is read out first, and this signal is compared with a reference signal dependent on the system conditions to determine an error from the reference signal. The optimum equalization coefficient is determined to eliminate this error from the reference signal and is set in the equalizer. The data is readout under the optimum equalization characteristics thus set.

13 Claims, 32 Drawing Sheets

FIG. 7

| CLASSIFICATION OF ISOLATED WAVEFORM | | I | II | III | IV |
|---|---|---|---|---|---|
| DIBIT PATTERN WAVEFORM | | | | | |
| ERROR VALUE SIGNAL FOR EQUALIZATION | Vp | POSITIVE VOLTAGE (ABNORMAL; PEAK-TO-PEAK INTERVAL IS LONG) | NEGATIVE VOLTAGE (ABNORMAL; PEAK-TO-PEAK INTERVAL IS SHORT) | 0 (NORMAL; PEAK-TO-PEAK INTERVAL) | 0 (NORMAL; PEAK-TO-PEAK INTERVAL) |
| | $V_A$ | 0 | 0 | POSITIVE VOLTAGE (POSITIVE PEAK VALUE IS BIGGER THAN NEGATIVE PEAK VALUE) | NEGATIVE VOLTAGE (NEGATIVE PEAK VALUE IS BIGGER THAN POSITIVE PEAK VALUE) |
| EQUALIZER PARAMETER | $C_{-2}$ | $(C_{-2})n < (C_{-2})n+1$ | $(C_{-2})n > (C_{-2})n+1$ | $(C_{-2})n > (C_{-2})n+1$ | $(C_{-2})n < (C_{-2})n+1$ |
| | $C_{-1}$ | $(C_{-1})n > (C_{-1})n+1$ | $(C_{-1})n < (C_{-1})n+1$ | $(C_{-1})n < (C_{-1})n+1$ | $(C_{-1})n > (C_{-1})n+1$ |
| | $C_1$ | $(C_1)n > (C_1)n+1$ | $(C_1)n < (C_1)n+1$ | $(C_1)n > (C_1)n+1$ | $(C_1)n < (C_1)n+1$ |
| | $C_2$ | $(C_2)n < (C_2)n+1$ | $(C_2)n > (C_2)n+1$ | $(C_2)n < (C_2)n+1$ | $(C_2)n > (C_2)n+1$ |
| | $T_{-2}$ | $(T_{-2})n < (T_{-2})n+1$ | $(T_{-2})n > (T_{-2})n+1$ | $(T_{-2})n > (T_{-2})n+1$ | $(T_{-2})n < (T_{-2})n+1$ |
| | $T_{-1}$ | $(T_{-1})n > (T_{-1})n+1$ | $(T_{-1})n < (T_{-1})n+1$ | $(T_{-1})n < (T_{-1})n+1$ | $(T_{-1})n > (T_{-1})n+1$ |
| | $T_1$ | $(T_1)n > (T_1)n+1$ | $(T_1)n < (T_1)n+1$ | $(T_1)n > (T_1)n+1$ | $(T_1)n < (T_1)n+1$ |
| | $T_2$ | $(T_2)n < (T_2)n+1$ | $(T_2)n > (T_2)n+1$ | $(T_2)n < (T_2)n+1$ | $(T_2)n > (T_2)n+1$ |

WAVEFORM { ——— (BROKEN LINE) A TARGET WAVEFORM FOR EQUALIZING.
{ ——— (SOLID LINE) A INSUFFICIENT WAVEFORM FOR EQUALIZING.
( )n: n-EQUALIZER PARAMETER IN THE PRESENT CONDITION. (Cb) IS COEFFICIENT INCLUDE SIGN.
n-1--EQUALIZER PARAMETER IN THE NEXT CONDITION.

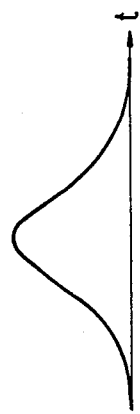
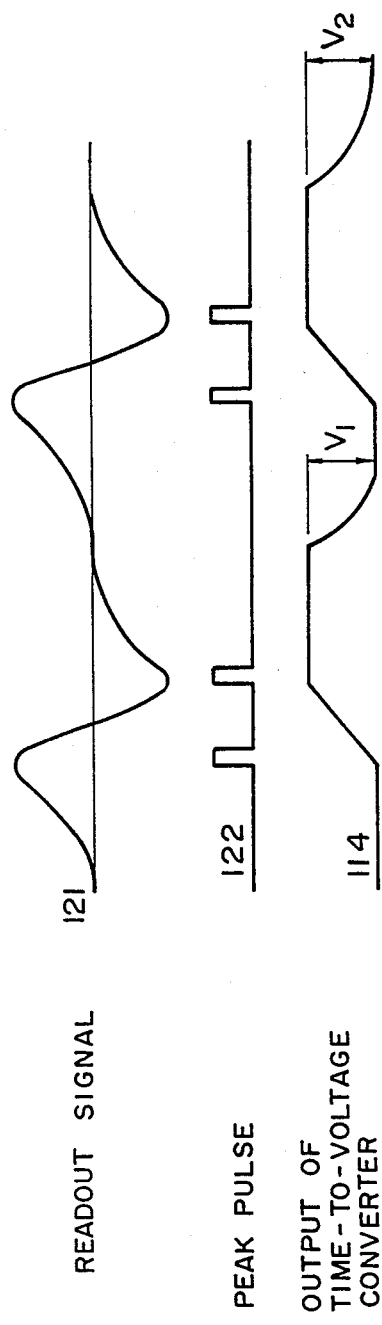
FIG. 16
FIG. 17

READOUT CIRCUIT IN MAGNETIC RECORDING DEVICE

BACKGROUND OF THE INVENTION

This invention relates to a readout circuit for a magnetic storage and readout device, or more in particular to a readout circuit suitable for obtaining equalization characteristics which are optimum for reducing a pattern peak shift.

Generally, a digital magnetic recording device such as a magnetic disk drive posed the problem of a pattern peak shift which is a cause of data reproducing error. FIG. 26 is a diagram showing an example of a pattern peak shift. This diagram indicates the manner in which a pattern peak shift occurs when two data including $B_1$ and $B_2$ are recorded. Assume that the waveform presented by $W_1$ and $W_2$ is corresponding to a reproduced signal from an isolated data $B_1$ and $B_2$, respectively. A readout waveform W is obtained when two data of $B_1$ and $B_2$ are recorded and is equal to superposition of $W_1$ and $W_2$ which interfere with each other, the result being that the amplitude thereof is reduced and the peak positions are displaced as shown by $P_1$ and $P_2$.

As seen from FIG. 26, pattern peak shift would not occur if the isolated readout waveform $W_1$ or $W_2$ has narrow spread skirts so as not to interfer with adjacent waveforms. Conventional devices have an equalizer for equalizing an isolated pulse waveform into a sharp wave form by cutting off the skirt thereof as disclosed in IEEE Trans. Magnetics, MAG-12, (1976) pp. 746 to 748 in order to reduce pattern peak shift.

In the case of a magnetic disk drive the head flying height on the outer radius of the medium is larger than that on the inner radius thereof, resulting in different isolated pulse waveforms. As diclosed in JP-A-51-167811, JP-A-61-139980 and JP-A-61-208606, equilizer coefficients, predetermined corresponding to track position, are selected or equalizer coefficients read out from an read only memory set in an equilizer in response to a head radius position signal. Such a system, in which the same equalizer coefficient is always set for a given track position, has the disadvantage mentioned below. Specifically, if the recording and readout characteristics undergo a change due to a change of head flying height or medium characteristics which are caused by production variations or a change on standing, it is necessary to also change the optimized equalization characteristics. Since the same equalization coefficient is set all the time, however, the optimized equalization characteristics cannot be obtained, and consequently the compensation is insufficient, thereby cause a reading error. On the other hand, a method has been suggested in which, as disclosed in JP-A-58-50612 and JP-A-60-113363, the pulse width at 50% amplitude point of an isolated pulse waveform ($PW_{50}$) of relative timing difference between the data pulse and the detection window is detected for continuous control of an equalizer. According to this method, ideal automatic equalization is possible if an isolated pulse waveform can be approximated by Lorentzian as in the case where a waveform is read out with a head having an ordinary ferrite head. It is, however, impossible to obtain an optimally equalized waveform in the case where the isolated waveform sharply expands in the neighbourhood of the foot of a peak thereof as seen from IEEE Trans. Magnetics, MAG-22, (1986) pp. 1209 to 1211 or includes an understood in such a case as with a thin film head.

SUMMARY OF THE INVENTION

A first object of the present invention is to provide a readout circuit including an automatic equalizer capable of producing optimum equalization characteristics against head or medium variations or changes in recording or readout characteristics on standing.

A second object of the present invention is to provide an automatic equalizer which is capable of always producing optimum equalization characteristics even against an isolated pulse waveform containing an undershoot.

A third object of the present invention is to provide an automatic equalizer which is capable of always producing optimum equalization characteristics even when an isolated pulse waveform has a sharply increased width in the neighborhood of the peak foot.

A fourth object of the present invention is to provide an automatic equalizer which is always capable of producing optimum equalization characteristics even when an isolated pulse waveform has asymmetry between a leading and trailing side.

A fifth object of the present invention is to provide an automatic equalizer which is capable of enlarging both a phase margin and a level margin.

A sixth object of the present invention is to provide an automatic equalizer capable of enlarging a phase margin in particular.

A seventh object of the present invention is to provide an automatic equalizer capable of enlarging a level margin in particular.

In order to achieve the above-mentioned objects, there is provided according to the present invention a readout circuit which operates as mentioned below.

First, together with the data transfer speed and a modulation method for recording and readout of the data, a recording frequency and a peak interval are determined. An ideal, shape of an isolated pulse waveform free of peak shift is also determined. On the other hand, an evaluation or test data signal for detecting an error in the equalization characteristics of an automatic equalizer is recorded in a portion before recording data of each track of a medium. In readout mode, a test data signal of a selected track is reproduced and during this period, an equalizer coefficient is controlled on the basis of the result of an evaluation of the test data signal. For controlling the equalizer coefficient, first the test data signal is compared with a reference signal dependent on the system conditions to determine an error from the reference signal. An optimum equalization characteristic is determined again in such a manner as to eliminate the error from the reference signal and set in the equalizer. After that, data is reproduced with an optimum equalization characteristic.

BRIEF DESCRIPTION OF THE DRAWINGS

FIG. 7 is a diagram showing the relationship between an error value signal for equalization and a method of changing the equalizer coefficient with an equalization isolated pulse waveform classified appropriately.

FIG. 16 shows a symmetric isolated pulse waveform.

FIG. 17 is a time chart for the embodiment of FIG. 15.

DESCRIPTION OF THE PREFERRED EMBODIMENTS

Figure 1:
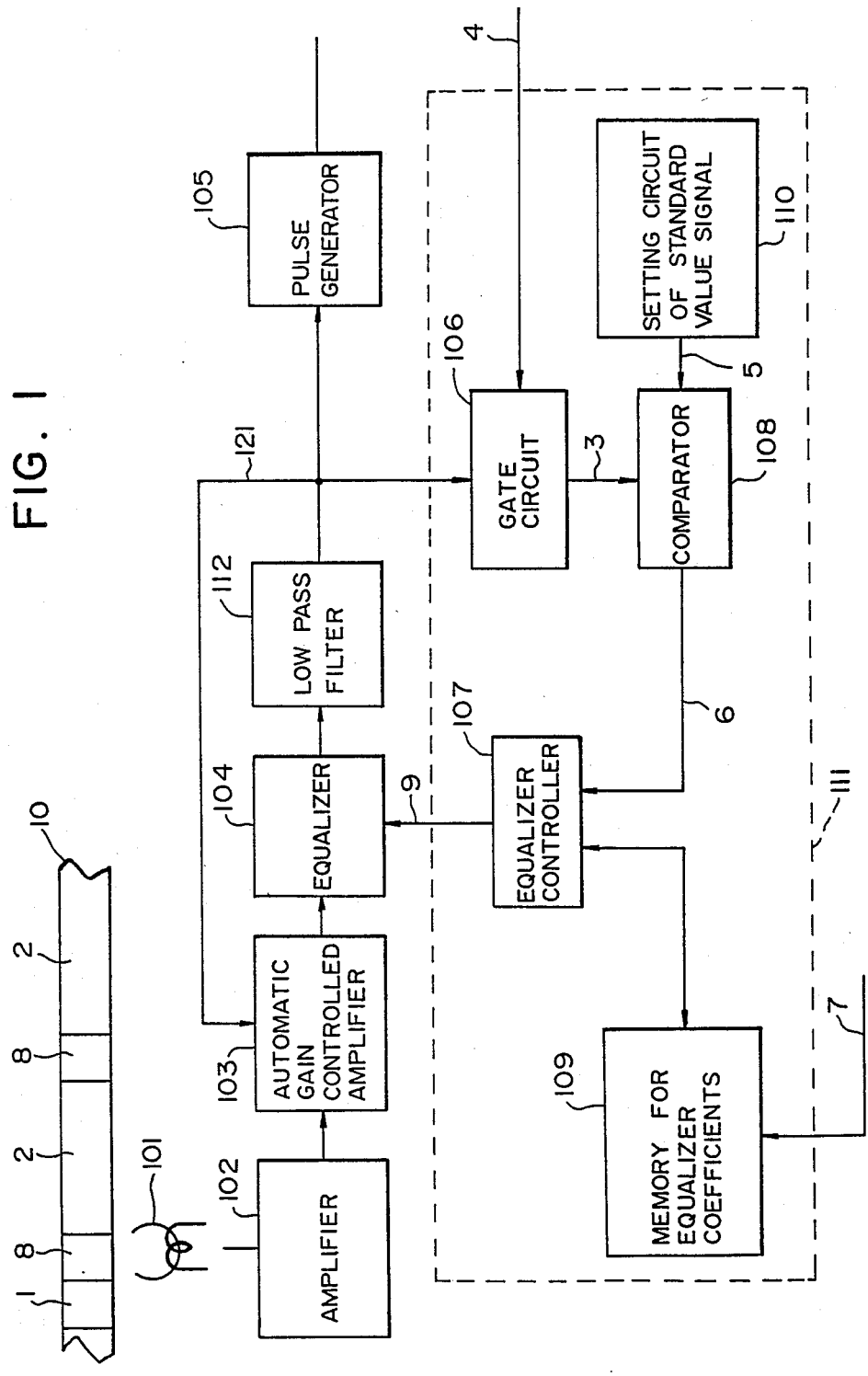
FIG. 1 is a diagram showing a configuration of the present invention.

A circuit configuration for reducing a pattern peak shift, which is an object of the present invention, will be described below in connection with FIG. 1, First, in formatting a medium 10, a home address signal or other data required for system control is recorded together with a test data 8 for determining the optimum equalization characteristic. The region for recording the test data is preferably located before a data region 2 for recording actual data, where the initiation of test data can be easily discriminated. According to the embodiment under consideration, it is, recorded immediately after a home address signal. Data is read out in steps as mentioned below.

First, an equalization coefficient is read from an equalization coefficient memory 109 by an address signal 7 of a selected track and set in an equalizer 104. An equalizer of which the equalization characteristic can be freely changed once the coefficient is set is used for this purpose. It may be a transversal equalizer, for example. With a coefficient set in such an equalizer, recorded data is reproduced to find an address marker. With reference to the address marker, the portion recorded with test data is found to produce a gate signal 4. The test data read out, on the other hand, is led to a gate circuit 106 as an equalizer output. The gate circuit 106 opens by the gate signal 4 thereby the equalizer output setting a reference signal according to the system conditions is compared with the test data signal 3 at a comparator 108 thereby to produce an error value signal for equalization 6. An equalizer controller 107 processes the equalization coefficient in such a manner that the equalizer error value signal 6 is zero during the time gate signal 4 is on, and sets the value again in the equalizer 104. At the same time, the value is recorded in an equalization coefficient memory 109. For the purpose of obtaining the optimum equalization coefficients, one to several test patterns are stored. Further, when the portion of the test data ends or when the optimum equalization characteristic is obtained, the gate signal 4 is operated to close the gate circuit 106, thus fixing an optimum condition of the equalization coefficient. After that, the recorded data is read out under the optimum equalization characteristics. This system is effectively applied to a magnetic disk drive, a magnetic tape drive, a photo-magnetic disk drive, a reversible photo-disk drive or a digital VTR.

Figure 2:
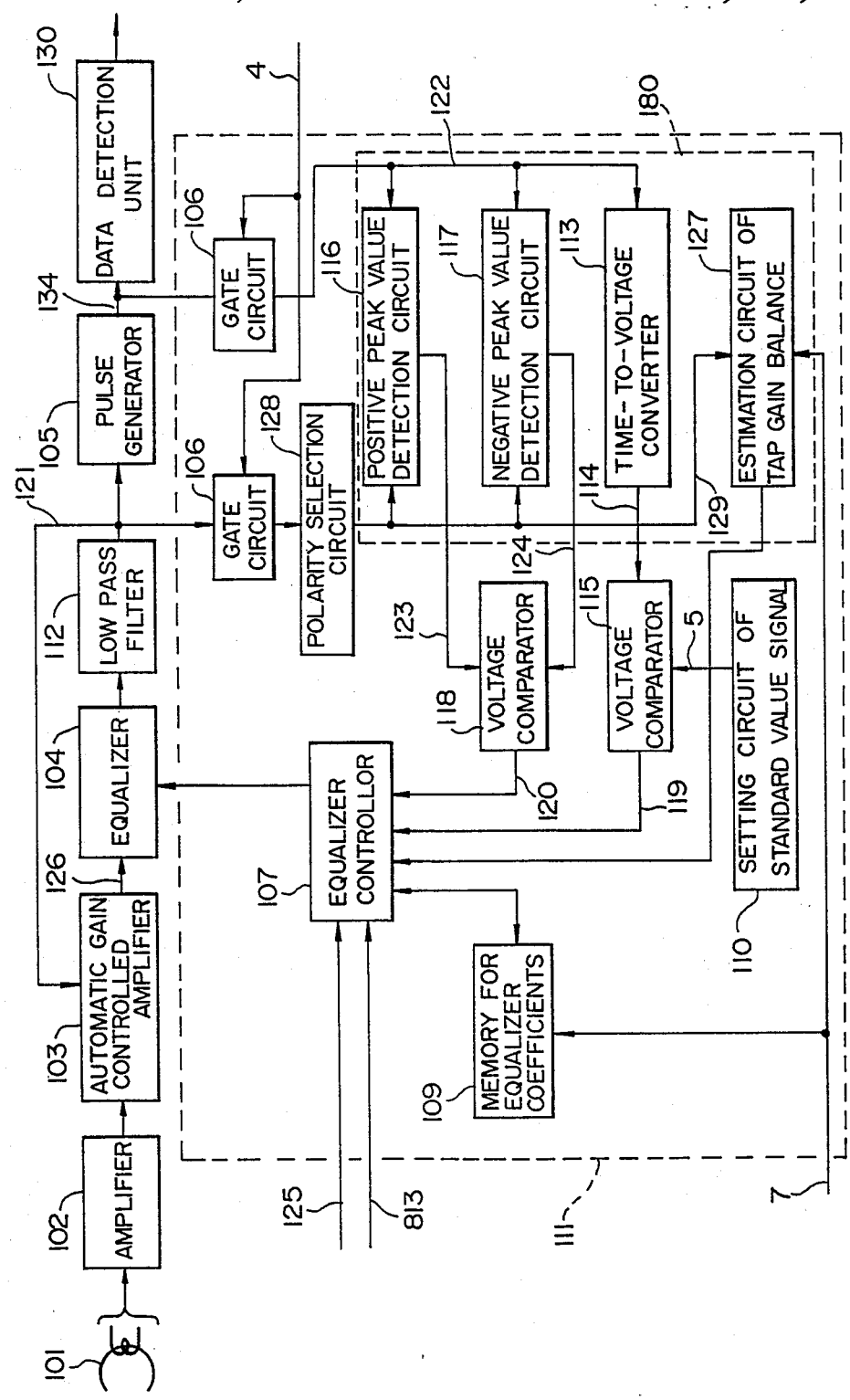
FIG. 2 is a diagram showing a configuration of a readout circuit according to a first embodiment.

Now, an embodiment for determining an optimum equalization coefficient intended to reduce a pattern peak shift as a first object and to enlarge both the phase margin and the level margin as a second object of the invention will be explained with reference to FIG. 2. This embodiment involves the use of a magnetic disk drive. A similar principle is applicable also to other drives.

First, a test data 8 is recorded on a medium mentioned above, that is a magnetic disk. For the purpose of enlarging both the phase and level margin, the test data may be such that the positive and negative waveform peak amplitudes and peak intervals of the readout waveform can be studied to evaluate the interference of the waveforms. For instance, it may be a dibit data, a 3-bit data or an n-bit data. For simplification, a dibit data will be used for explanation. This data may be recorded before shipment from the factory or rewritten by each user before operation.

First, an equalization coefficient memory 109 is stored at each track thereof with the value of the optimum equalization coefficient meeting the characteristic of the magnetic head/magnetic disk at the time of shipment from the factory. The equalization coefficients can be selected to be the same value for neighboring plural tracks instead of individual tracks. This equalization coefficient memory may take the form of a small-capacity nonvolatile memory or a nonvolatile semiconductor memory device capable of write and read operations.

Figure 5:
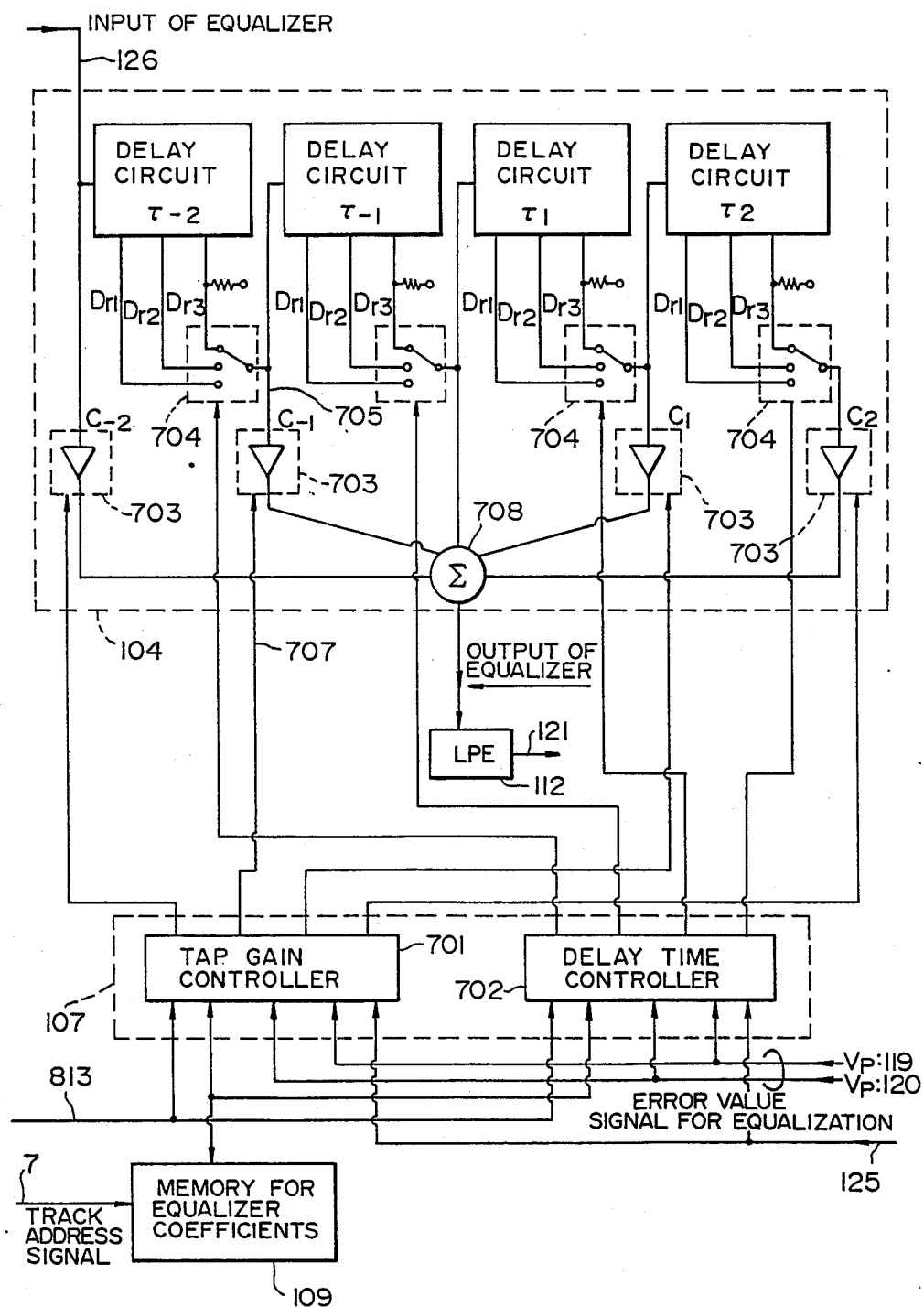
FIG. 5 is a diagram showing a configuration of an equalizer control circuit and an equalizer.
Figure 6:
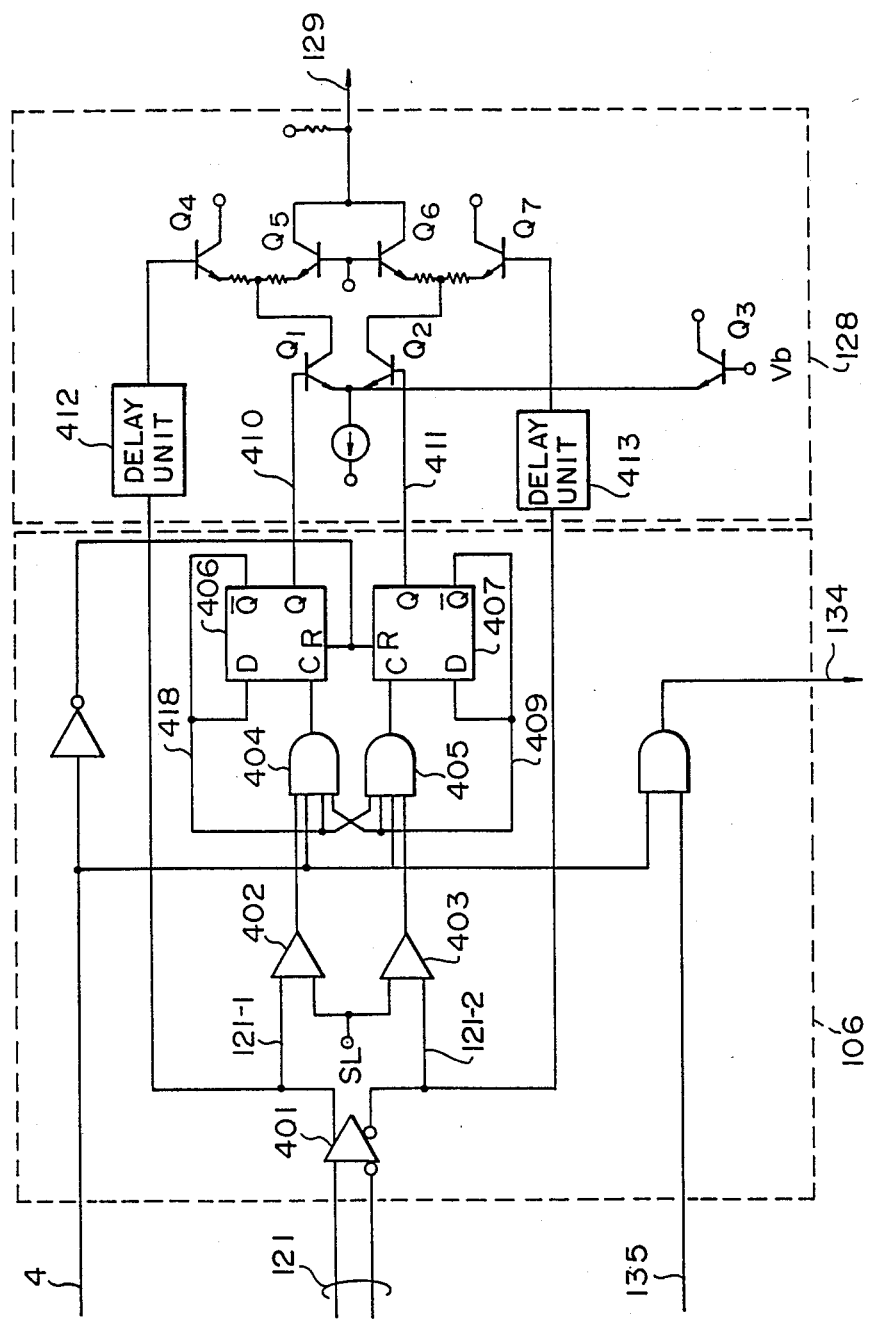
FIG. 6 shows a gate circuit and a polarity selection circuit according to the embodiment of FIG. 2.

After that, when the user starts operation, the optimum equalization coefficient is always obtained by the steps described below. According to this embodiment, explanation will be made using a 5-tap transversal equalizer most effective in operation shown in FIG. 5. In reading out the data recorded on the magnetic disk, a track address recorded with the particular data is designated by the signal processing unit. During the seek operation to the designated track, the value of the equalization coefficient corresponding to the designated track, the equalization coefficients, the tap gain and the delay time of a delay element are read out of the equalization coefficient memory 109 in response to the track address signal 7. The equalization coefficient thus read out is set through an equalizer controller 107 in a tap gain circuit 703 of the equalizer 104 and a tap switching circuit 704 of the delay element. After that, the data recorded in the track is reproduced, a home address is found as mentioned above, and the dibit pattern recorded as a test data is reproduced. The reproduced dibit pattern is first amplified in an amplifier 102. Further, when data on the inner and outer radius tracks of the magnetic disk are reproduced, the readout signals thereof have different amplitudes. In order to compensate for the difference, the amplitude level of the readout signal is fixed through an automatic gain controlled amplifier 103. The signal is further applied through the equalizer 104 and a low-pass filter 112 to produce an equalizer waveform 121. When the test data is being read out, on the other hand, the gate circuit 106 is opened by the gate signal 4, and in order to evaluate whether the equalizer waveform is optimum or not, the equalized signal is applied to positive peak value detection circuit 116 or negative peak value detection circuit 117 or estimation circuit of top gain balance 127. On the other hand, in order to obtain a peak interval of dibit pattern waveform, a pulse generator 105 generates a peak pulse from an equalizer waveform. After that, the signal is applied through the gate circuit 106 to a positive peak value detection circuit 116 or negative peak value detection circuit 117 or a time to voltage converter 113. The gate circuit 106 is shown in FIG. 6. Further, the equalization coefficient evaluation circuit 111, at which the first peak of the dibit pattern test data signal is required to be positive in polarity for correct peak value detection, is provided with a polarity selector 128. The polarity selection circuit is shown in FIG. 6. The gate circuit and the polarity selection circuit will be explained.

First, the equalized waveform 121 of the differential signal is applied through a buffer amplifier 401 to slice circuits 402, 403. One of the input slice circuits is given a slice level SL. The slice level is positive and its amplitude is about 50% of the waveform amplitude. Explanation will be made mainly on the waveform on the 121-1 side of the equalized waveform. With reference to the dibit pattern on the 121-1 side, if the peak of the first waveform is positive, the slice circuit 402 produces a pulse earlier the pulse produced by the slice circuit 403. On the other hand, the gate signal is closed (level "L") before the read operation of the test data, and therefore the flip-flop 406, 407 are reset with the Q complementary outputs 408, 409 at "H" level. When the test data is read out, the gate signal 4 is opened ("H" level), the flip-flops 406, 407 wait for input. Also, since the gate signal 4 is at "H" level, the AND circuits 404, 405 also wait for input. A pulse from the slice circuit 402 is applied as a clock input to the flip-flop 406 through the AND circuit 404. The data input of the flip-flop 406 is supplied with the "H" level signal of the Q complementary output 408, and therefore an "H" level signal is at the Q output 410 after clock input, while a "L" level signal produced at the Q complementary output 408. The AND circuits 404, 405 are supplied with the Q complementary output 408, and therefore the AND circuit is closed, thus rejecting all subsequent inputs. Specifically, the "H" or "L" level of the Q outputs 410, 411 of the flip-flops are determined by the first bit of the first dibit pattern. In the case under consideration, the output 410 is at "H" level and 410 at "L" level. Then, the base of a transistor $Q_1$ of a current switch circuit including transistors $Q_1$, $Q_2$ and $Q_3$ is supplied with 410, and the base of $Q_2$ thereof with 411. The base of $Q_3$ is supplied with a voltage Vb which is lower than "H" level and higher than "L" level. In the case under consideration, 410 is at "H" level, and therefore $Q_1$ is turned on, so that the buffer amplifier circuit comprised of $Q_4$ and $Q_5$ is turned on. On the other hand, 411 is at "L" level, and $Q_2$ is turned off, so that the buffer amplifier circuit comprised of $Q_6$ and $Q_7$ are also turned off. The base of the buffer amplifier $Q_4$ is supplied with the equalized waveform 121-1 through a delay circuit 412. As a result, the energized waveform 121-1 is put out as a test data signal 129. On the other hand, if the first peak of the dibit pattern at 121-1 is negative, a pulse is produced first from the slice circuit 403 connected to 121-2 which is an inverted signal of 121-1. Then, in a process similar to the process mentioned above, the signal of 121-1 is put out as a test data signal 129. The dibit pattern of this test data signal 129 always has a positive first peak.

Next, the waveform evaluation circuit evaluates the peak interval of the dibit pattern. In order to determine the time interval between the front peak pulse and the rear peak pulse, the time is converted into a voltage or current level at a time level conversion circuit 113. In a method of time level-conversion, a capacitor is charged or discharged with a constant current, the output voltage of the capacitor is proportional to the duration of supply of the constant current. Utilizing this function, the capacitor is charged at a constant current to convert time level during time intervals between the front peak pulse and the rear peak pulse into voltage level, as the test data level Vn114. The test data level Vn114 is compared with a reference level Vr5 corresponding to the correct dibit pattern interval set in a reference signal setting circuit 110 at a level comparator 115. The resulting level difference is applied to the equalizer controller 107 as an error value signal for equalization Vp119 to reduce the phase margin.

Figure 3:
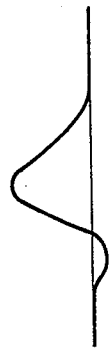
FIG. 3 is a diagram showing an asymmetric isolated readout waveform.

Further, in the case where the waveform shape of the leading and trailing edges are asymmetrical as shown in FIG. 3, there occurs a difference between positive and negative amplitudes of the dibit pattern waveform. In such a case, the level margin is reduced. The equalization coefficient is thus evaluated to equalize the waveform into a symmetric isolated pulse waveform. First, in order to compare positive and negative amplitudes, they are applied to a positive peak value detection circuit 116 and a negative peak value detection circuit 117 respectively. The respective peak value detection circuits determine positive and negative peak values by a peak hold circuit or a sample hold circuit and apply the resulting signals to an amplitude level comparator 118. The amplitude level comparator 118 applies the level difference to the equalizer controller 107 as an error value signal for equalization va120 to reduce the level margin.

The equalizer controller 107 divides the cases as shown in FIG. 7 by error value signals for equalization 119, 120 thereby to change the equalization coefficient in order to eliminate the error value signal for equalization. Specifically, when the peak interval of a dibit pattern is wider than a reference, the error value signal for equalization Vp is a positive-level signal, and when it is narrower than a reference, a negative-level signal. Also, if the positive peak value of the dibit pattern is larger than the negative peak value thereof, on the other hand, the error value signal for equalization Va is a positive level signal, and when the negative peak value is larger, a negative level signal. In the case where a waveform has the same positive and negative peak values but a wider peak interval, it is defined as class I, in which case the equalization coefficient is changed in the manner mentioned below. As to the tap gain, in the first place, $C_1$ and $C_{-1}$ including the sign are reduced, while $C_2$ and $C_{-2}$ are including the signs are increased. As to the delay time, on the other hand, $\tau_1$ and $\tau_{-1}$ are shortened while $\tau_2$ and $\tau_{-2}$ are lengthened. Generally, however, the positive and negative peak values are often different and also a peak interval is different from a reference. Such a case will be explained. As an example, assume that the peak interval is short with a large positive peak level. In such a case, the narrow peak interval defines the waveform as class II, and the large positive peak level defines the waveform as class III. From the table of change in equalization coefficient of classes II and III, therefore, the value of the equalization coefficient is changed in the manner mentioned below. First, as to the tap gains $C_{-1}$ is increased, and $C_{-2}$ decreased successively. As to $C_1$ and $C_2$, on the other hand, they are not changed. As to the delay time, $\tau_{-1}$ is lengthened, while $\tau_2$ is shortened. As to $\tau_{-1}$ and $\tau_{-2}$, on the other hand, they are left unchanged. By changing the equalization coefficient in this manner, the same principle is applicable generally.

Figure 8:
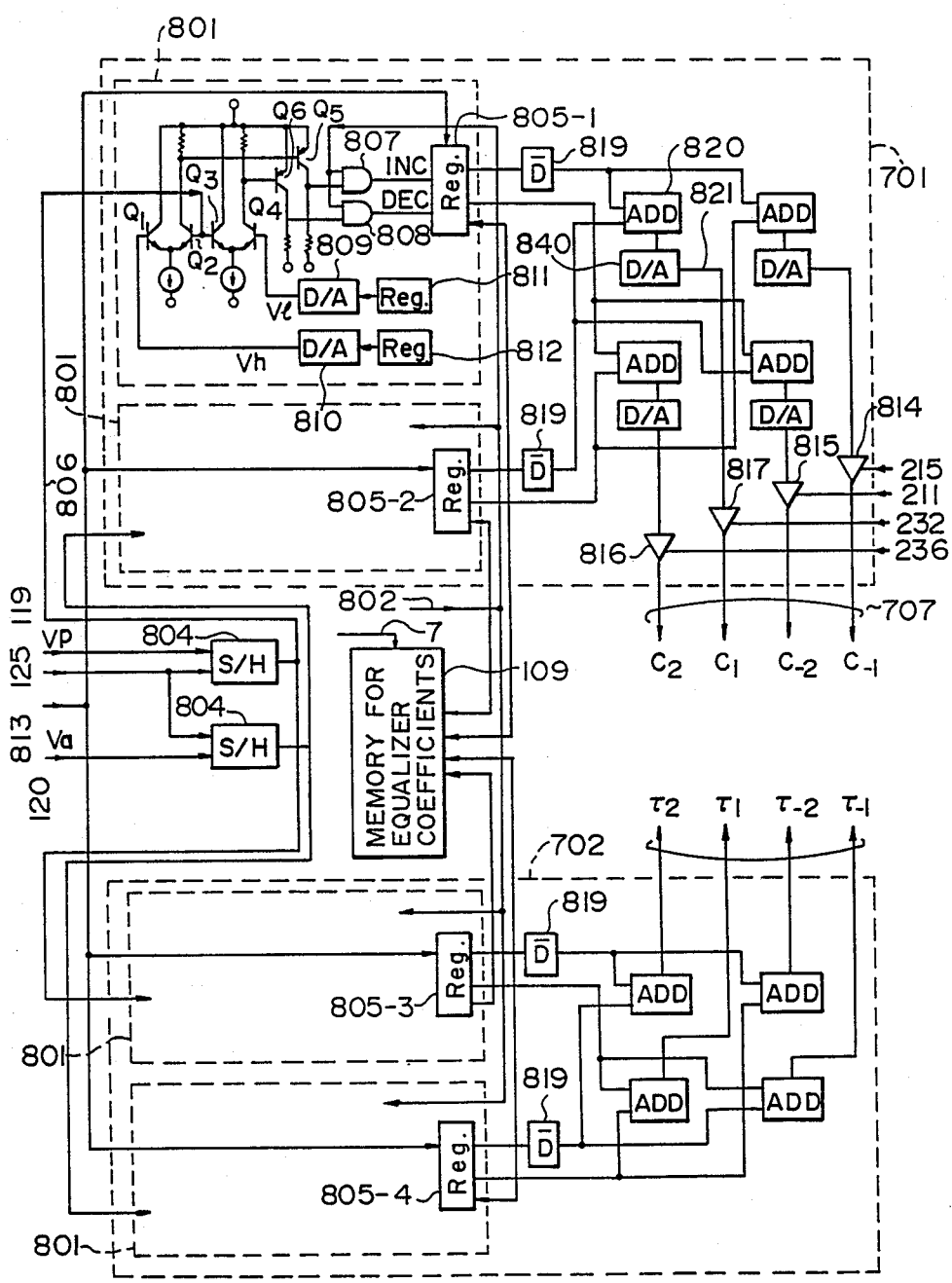
FIG. 8 is a diagram showing a configuration of an equalizer control circuit.
Figure 9:
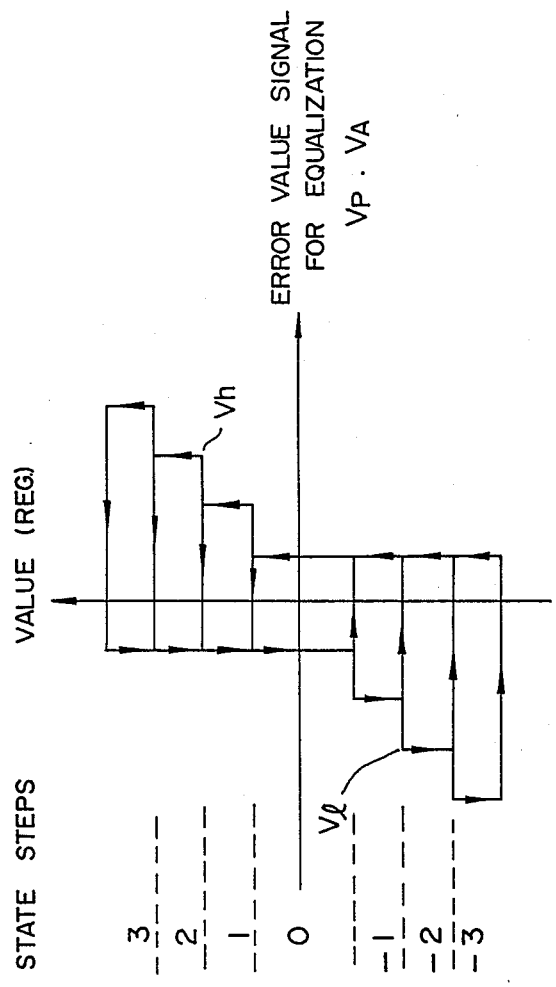
FIG. 9 shows the characteristic of the relationship between a equalization error signal voltage and an equalizer coefficient, control register.

A circuit realizing an equalization coefficient change table is shown in FIG. 8. In FIG. 8, level signals for the error value signals Vp119, Va 120 are applied to a sample hold circuit 804 to produce a level hold signal 806 by a sample pulse 125. The level hold signal 806 is applied to an error value signal level comparator 801. The error value signal level comparator 801 includes a switching circuit having a hysteresis as shown in FIG. 9 between the level hold signal 806 and the value of a register 805 thereby to prevent a false operation due to noises at the time of deciding a condition level. This characteristic permits division into condition levels corresponding to the magnitude of the error signal, and thus a high limit voltage Vh and a low limit voltage Vl associated with each condition may be set to digital to analog converters 810. The operation of the error signal level comparator 801 will be explained with reference to an example. First, when a target track is selected, initial equalization coefficients are set to the registers 805. A test data is read and evaluated, after which it is obtained as an error value signal for equalization Vp119, Va120. If the level of the error signal, that is, the level hold signal 806, exceeds the high limit voltage Vh, for instance, a transistor $Q_2$ of the current switch circuit made up of $Q_1$ and $Q_2$ is turned on to reduce the collector level. At the same time, the base of $Q_2$ connected to the collector of $Q_2$ is reduced thereby to turn on $Q_5$. When $Q_5$ turns on, the collector level rises, and an "H" level is applied to one of the inputs to the AND circuit 807. If a clock pulse 802 is applied to the AND circuit 807 under this condition, an INC signal that is an add signal of the register 805 is generated to add the register value. At the register 812, an $\alpha$ level corresponding to the threshold voltage is set to prevent a false operation due to a noise thereby to set a high limit voltage level to a digital to analog converter 810. This $\alpha$ level is determined by the signal-to-noise ratio of the signal after equalization. After this process, a high limit voltage Vh is applied to the base of $Q_1$. The levels are again compared at $Q_1$ and $Q_2$ to repeat similar process at every dibit pattern of the test data. This process is repeated until the level hold signal 806 is reduced between the high limit signal voltage Vh and the low limit signal voltage Vl. When the level hold signal 806 is lower than the low limit voltage Vl, on the other hand, a transistor $Q_4$ of a current switch circuit made up of $Q_3$ and $Q_4$ is turned on to reduce the collector level. At the same time, the base of $Q_6$ connected to the collector of $Q_4$ is reduced to turn on $Q_6$. When $Q_6$ is thus turned on, the collector level rises so that "H" level is applied on one of the inputs to the AND circuit 808. When the clock pulse 802 is applied to the AND circuit 808 under this condition, DEC signal that is a decrement value of the register 805. The $\beta$ level corresponding to the threshold voltage for preventing a false operation due to a noise from the value is applied to a register 811, thereby setting a low limit voltage level to a digital to analog converter 809. This $\beta$ level is also determined by the signal-to-noise ratio of a signal after equalization. After that, the a low limit voltage Vl by the analog/digital converter 810 is applied to the base of $Q_4$. Levels are again compated at $Q_3$ and $Q_4$ to perform a similar process. This process is repeated until the level hold signal 806 is reduced between the high limit voltage Vh and the low limit voltage Vl. In the case where the level hold signal 806 is higher than the low limit voltage Vl and lower than the high limit voltage Vh, on the other hand, both $Q_5$ and $Q_6$ are turned off and neither INC signal or DEC signal is produced. The register value is thus left unchanged. This process is performed for each of the error value signals for equalization Vp119 and Va120 to determine each register value 805. From each register value, each equalization coefficient value is produced in accordance with the equalization coefficient change table of FIG. 7. This operation is performed in the manner mentioned below. As an example reference is made to the tap gain $C_1$. The tap gain $C_1$ is determined from the relationship between the error value signals Vp119 and Va120. The value of the register 805-1 determined by Vp119 is added to the value of the register 818 determined by the error value signal for equalization Va120 at an adder circuit 820 to determine the tap gain $C_1$. In the case where the register value is positive, however, the tap gain $C_1$ is required to be reduced as indicated by the equalization coefficient table of FIG. 7. The outputs of the registers 805 and 818 are thus converted into negative values through a translation circuit in one's complement 819. The output of the adder circuit 820 is converted into a voltage level at a digital/analog converter 840 and is produced as a tap gain reference output 821.

Figure 10:
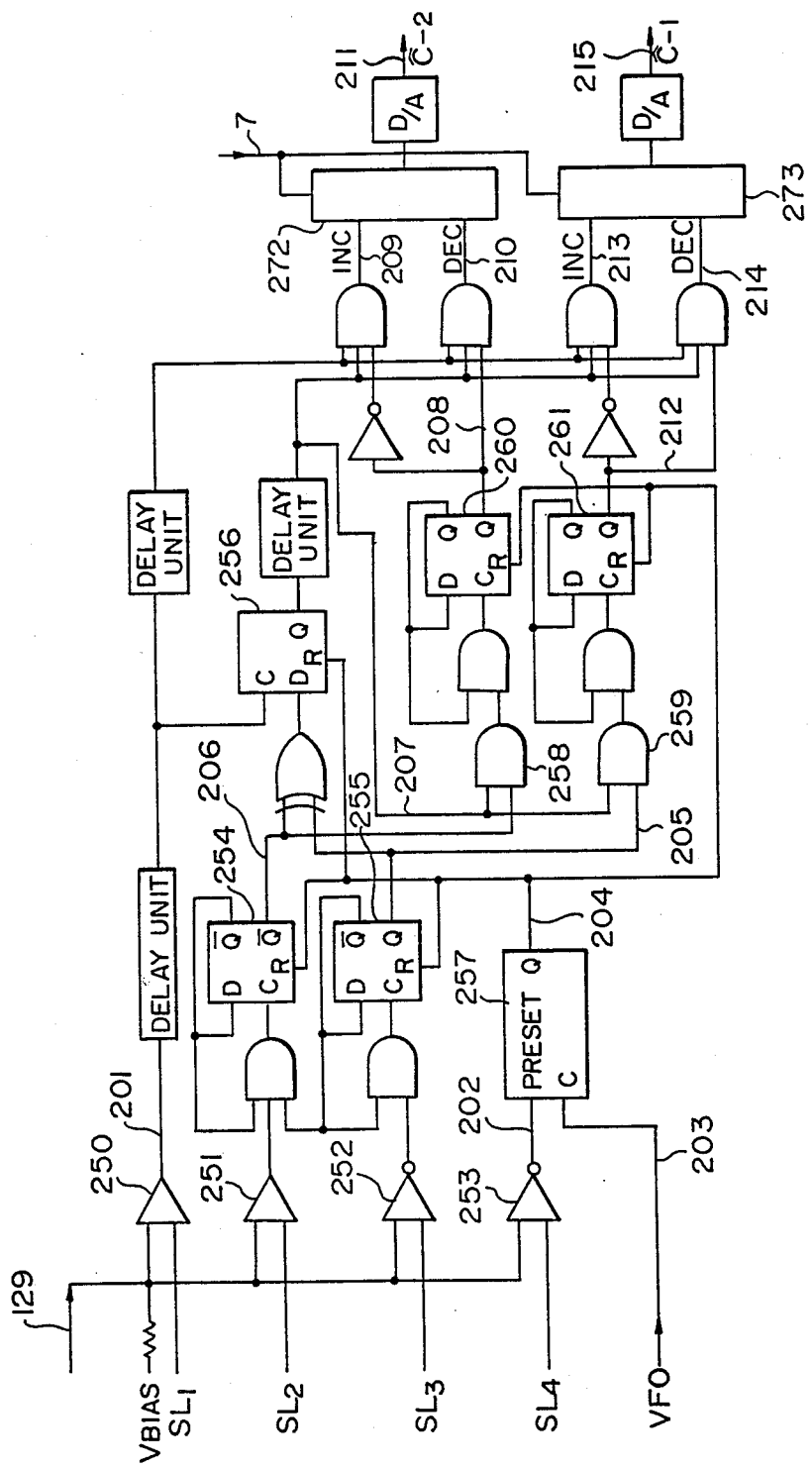
FIG. 10 is a diagram showing a tap gain ratio evaluation circuit of $C_{-1}$ and $C_{-2}$.
Figure 11:
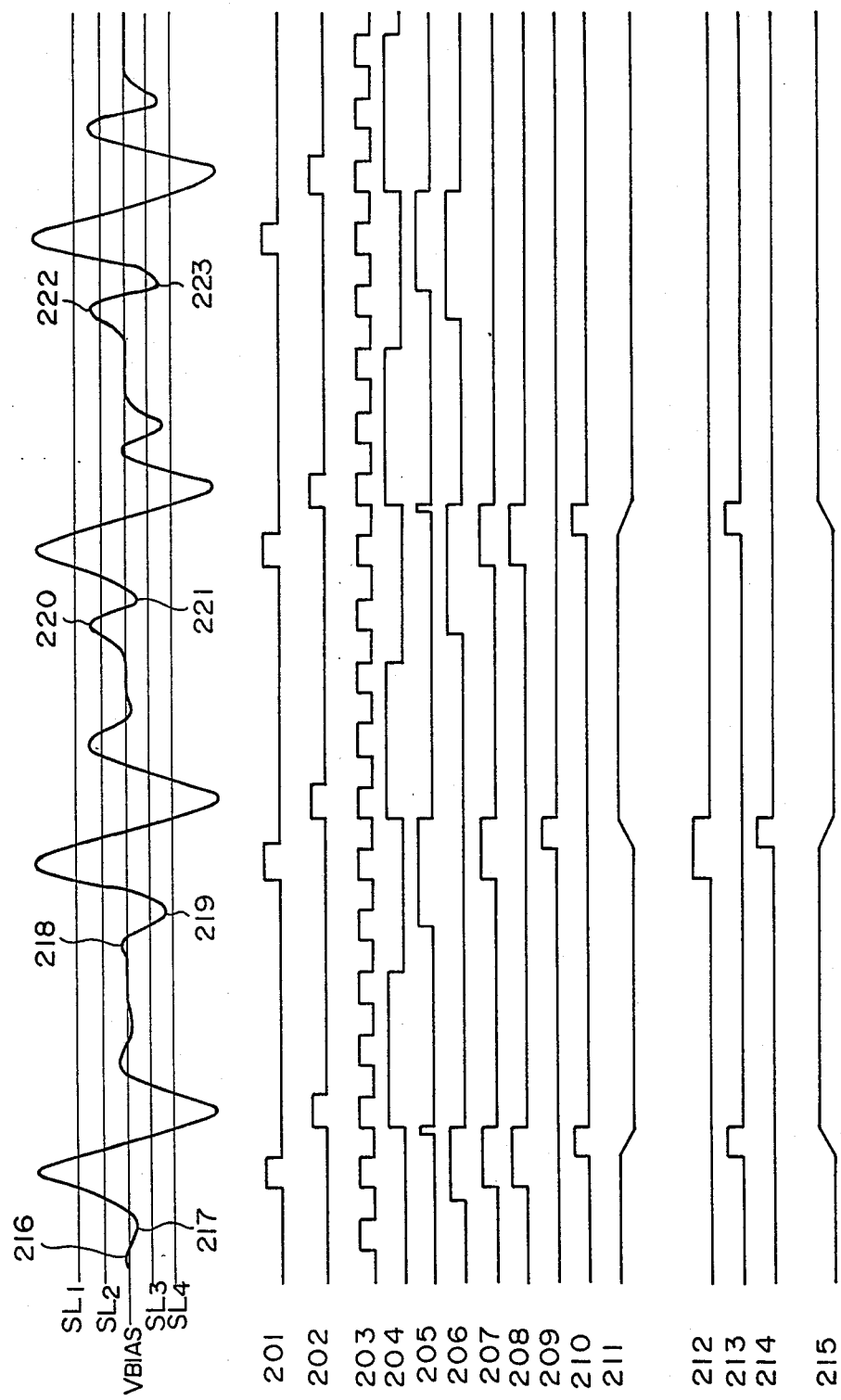
FIG. 11 is a diagram showing a time chart of FIG. 10.
Figure 12:
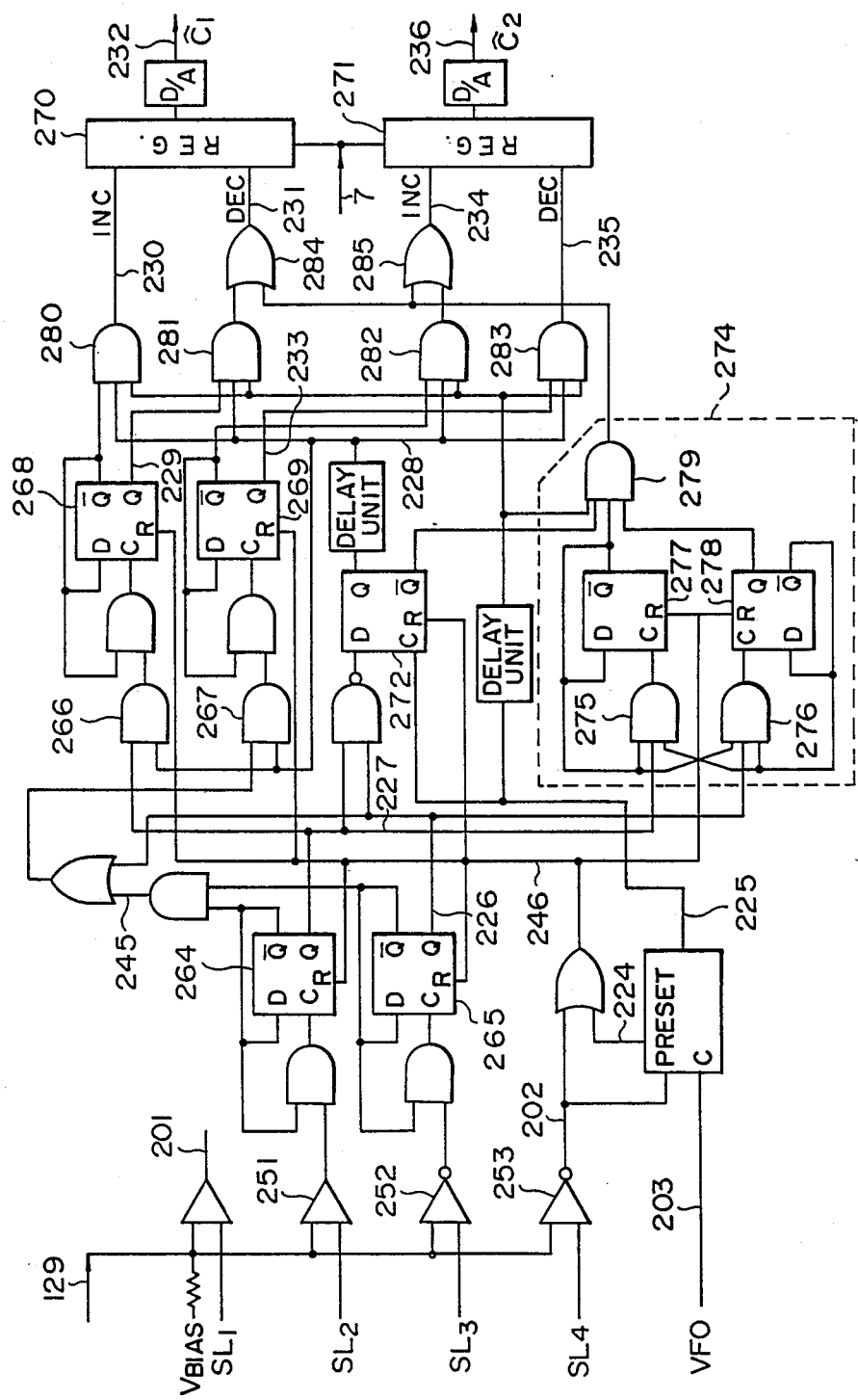
FIG. 12 is a diagram showing a tap gain ratio evaluation circuit of $C_1$ and $C_2$.

The manner in which each tap gain is changed is shown but the ratio of change between tap gains is not shown in the equalization coefficient change table of FIG. 7. The change between tap gains is determined at a tap gain ratio evaluation circuit 127 in FIG. 2. The circuit of this part is shown in FIGS. 10 and 12, and a time chart in FIGS. 11 and 13. The portion of the tap gain ratio evaluation circuit 127 which determines the ratio of tap gains $C_{-1}$ and $C_{-2}$ will be explained with reference to FIGS. 10 and 11. The function of this circuit portion is to evaluate the magnitude of false peaks 216, 217, 220, 221 before the front bit of the dibit pattern as shown in FIG. 10. First, the gain ratio of $C_{-2}$ will be explained. Under the condition where the negative false peak 217 is higher than a slice signal $SL_3$, the gain ratio of $C_{-2}$ is reduced. In the case where the negative false peaks are lower than $SL_3$, however, the gain ratio is increased if a positive false peak 218 is lower than $SL_2$, and the gain ratio of $C_{-2}$ remains unchanged if a positive false peak is higher than $SL_2$. The gain ratio of $C_{-1}$ will be explained. Under the condition where a negative false peak 220 is higher than $SL_3$, the gain ratio of $C_{-1}$ increases. In the case where the negative false peaks 219 and 222 are lower than $SL_3$, however, the gain ratio of $C_{-1}$ is reduced if the positive false peak 218 is lower than $SL_2$ and the gain ratio of $C_{-1}$ is kept unchanged to the extent that the positive false peak 222 is higher than $SL_2$.

Now, the operation of a circuit realizing the above-mentioned functions will be explained. First, registers 272 and 273 are reset by a track address signal 7. A test data signal 129 is then compared with four slice levels $SL_1$, $SL_2$, $SL_3$ and $SL_4$ as shown in FIGS. 10 and 11. Each slice level will be explained. $SL_1$ and $SL_2$ are levels more positive than the bias level Vbias, and $SL_3$ and $SL_4$ are lower than the bias level Vbias. $SL_1$ is set at about 50% of the waveform peak level to discriminate the first bit of the each dibit pattern. $SL_4$ is set to about 50% of the waveform peak level to discriminate the bit after the dibit pattern. $SL_2$ is for discriminating a false positive peak before the bit forward of the dibit pattern. $SL_3$ is for discriminating a negative false peak before the dibit pattern. As an example, explanation will be made concerning four types of test data signals which are applied to a time series as shown in FIG. 11. The first test data signal is such that neither the positive false peak 216 or the negative false peak 217 is beyond the slice levels $SL_2$ and $SL_3$. The first bit forward of the dibit pattern, however, crosses $SL_2$, and therefore a pulse is produced from the slice circuit 251, but not any pulse from the slice circuit 252. For this reason, the Q output 206 of the flip-flop 254 is raised to "H" level, while the Q output 205 of the flip-flop 255 is reduced to "L" level. Further, the levels of 205 and 206 are combined to raise the Q output 207 of the flip-flop 256 to "H" level. As a result, the AND circuits 258 and 259 turn on and their output levels of 205 and 206 are put to the flip-flop 260 and 261. The Q output 208 of 260 is thus raised to "H" level and the Q output 212 of 261 reduced to "L" level. In view of the fact that 208 is at "H" level, the DEC signal 210 becomes effective to decrement the value of the register 272. As a result, the voltage of the gain compensator control signal 211 of $C_{-2}$ is reduced thereby to reduce the gain ratio. Since 212 is at "L" level, on the other hand, the INC signal 213 becomes effective, thus adding the value of the register 273. The voltage of the gain compensator control signal 215 of $C_{-1}$ is thus increased thereby increasing the gain ratio. The second, third and fourth test data signals also go through a similar process to produce a gain compensator control signal satisfying each case. A reset signal 204 for 254, 255, on the other hand, has a function not to detect a false peak before the dibit pattern. The reset signal 204 is generated in the manner mentioned below. A counter 257 with a window detection signal 203 as a clock is preset at 202 as an output of the slice circuit 253 and is produced as a reset signal 204 over a section of several bits.

Figure 13:
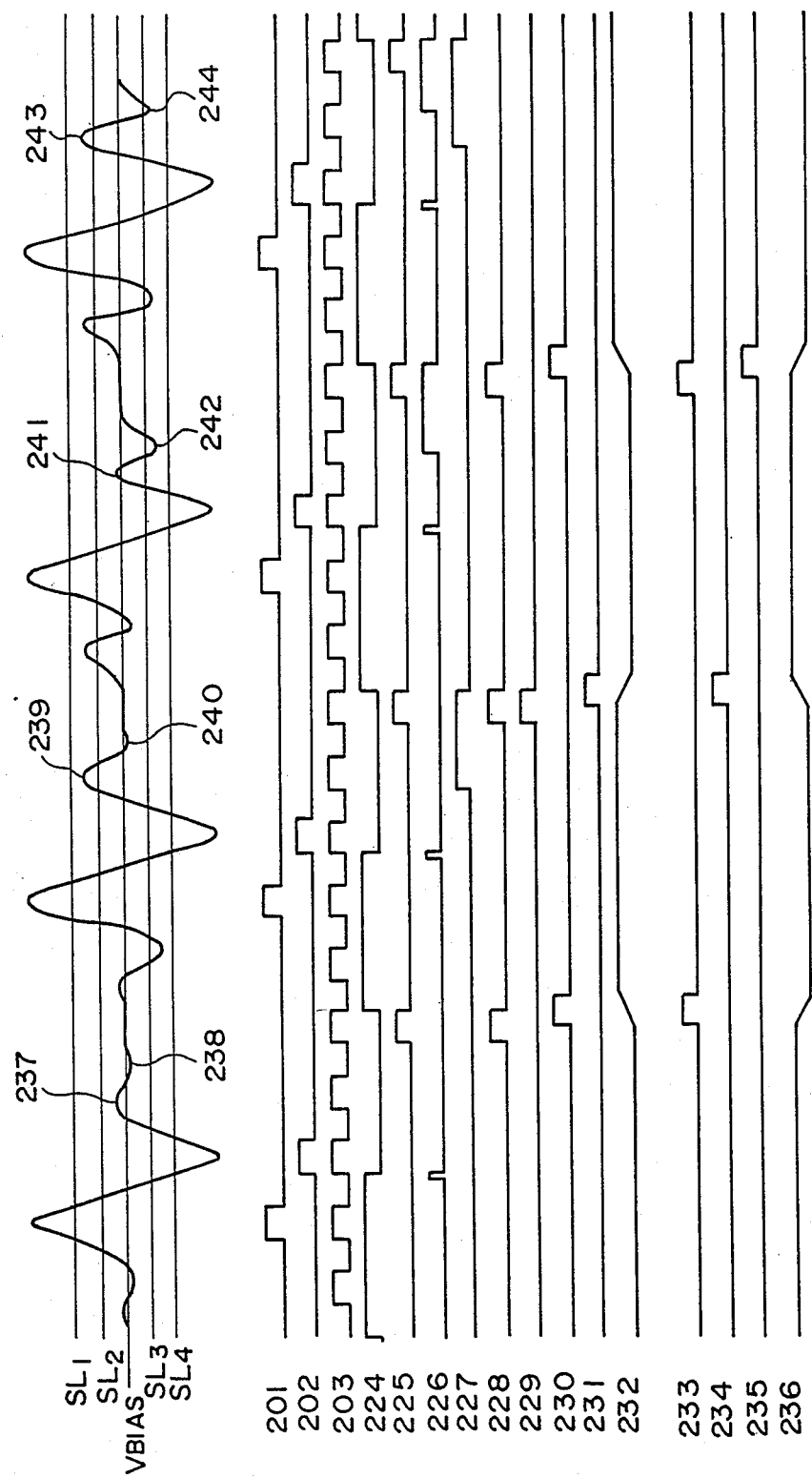
FIG. 13 shows a time chart for FIG. 12.

The portion of the tap gain ratio evaluation circuit 127 which determines the tap gains $C_1$ and $C_2$ will be explained with reference to FIGS. 12 and 13. The function of this circuit portion is to evaluate the magnitude of false peaks 237, 238, 239, 244 after the dibit pattern. First, explanation will be made about the gain ratio of $C_1$. Under the condition where a positive false peak 237 is lower than $SL_2$, the gain ratio of $C_1$ is increased. In the case where positive false peaks 239, 243 cross $SL_2$, however, the gain ratio of $C_1$ is reduced if a negative false peak 238 is higher than $SL_2$, and the gain ratio is kept unchanged if a negative false peak 244 is lower than $SL_3$. Now, the gain ratio of $C_2$ will be explained. Under the state where a positive false peak 237 is lower than $SL_2$, the gain ratio of $C_2$ is reduced, while in the case where positive false peaks 239, 243 are lower than $SL_2$, however, the gain ratio of $C_2$ is raised if a negative false peak 240 is lower than $SL_3$, but the gain ratio of $C_2$ is kept unchanged otherwise. In the process, a noise problem is posed so that when the second bit of the dibit pattern is beyond the slice level $SL_3$, an output is produced in the same manner as if a false peak occurs. In order to eliminate this problem, the method mentioned below is used. This method is for discriminating the conditions under which positive and negative false peaks are beyond $SL_2$ and $SL_3$. Specifically, a false operation caused by noise is determined if an output is produced such as when a negative false peak occurs before the time point of a positive false peak is beyond $SL_2$. In this case, the same process is performed as in the case where a positive false peak is higher than $SL_2$ but not when a negative false peak is lower than $SL_3$.

Now, the operation of a circuit realizing the above-mentioned function will be explained. First, registers 270, 271 are reset by the track address signal 7. After that, this circuits slices the test data signal 129 at three slice levels $SL_2$, $SL_3$ and $SL_4$. Each of the slice levels is the same as that used for evaluation of a false peak before the dibit pattern mentioned above. As an example, explanation will be made about a case in which four types of test data signals are applied to a time series system as shown in FIG. 13. A first test data signal, together with a positive false signal 237 and a false peak signal 238 fails to cross the slice levels $SL_2$ and $SL_3$. As a result, no pulse is produced from the slice circuits 251, 252, and the Q outputs of the flip-flops 264 and 265 are kept at "L" level. An AND circuit 266 with 227 as an input is closed, and the Q output of the flip-flop 268 is held in "L" level. Specifically, the INC signal 230 becomes effective for the register 270 thereby adding the register value of 270. By doing so, the voltage of the gain compensator control signal 232 is increased thereby to increase the gain ratio. The AND circuit 267, on the other hand, is supplied with an AND signal 245 of a complementary output of Q of 264, 265 or an output a Q output 226 of the flip-flop 265. In the present case, the complementary outputs of Q for both 264 and 264 are at "H" level, and therefore the AND signal 245 becomes "H" level. The AND circuit 267 thus conducts, and an "H" level signal is produced at the Q output 233 of the flip-flop 269. Specifically, a DEC signal 235 becomes effective for the register 271 thereby decrementing the register value 271. As a result, the voltage of the gain compensator 236 is reduced thereby reducing the gain ratio. The second, third and fourth test data signals follow a similar process thereby to produce a gain compensator control signal commensurate with the prevailing situation. Also, the portion indicated by 274 is a circuit which has solved the above-mentioned problem caused by a noise. The operation of this system will be explained with reference to a case in which the Q output 266 has become "H" level due to a noise. When the Q output 226 becomes "H" level, the AND circuit 276 turns on to reduce the complementary output Q of the flip-flop 278 to "L" level. Since this level is applied to the AND circuits 275, 276, the AND circuits 275 and 276 are closed. As a result, even when the Q output of the flip-flop 264 becomes "H" level, the AND circuit 275 is kept off. The complementary output of Q of the flip-flop 277 and the Q output of 278 are at "H" level. On the other hand, the outputs 226 and 227 are at "H" level, so that the Q output 228 of the flip-flop 272 is reduced to "L" level with the complementary output of Q at "H" level. Since the output 228 is at "L" level, the AND circuits 280, 281, 282 and 283 are closed. Since the AND circuit 279 is turned on, however, signals are applied to the respective registers through OR circuits 284 and 285. The register 270 is supplied with a DEC signal 231, and the register 271 with an INC signal 234. On the other hand, reset signal 246 for 264 and 265 is provided with a function not to detect other than a false peak after the bit rearward of the dibit pattern. This signal is produced in the same manner as mentioned above. The gain compensator control signals 211, 215, 232 and 236 providing outputs of the tap gain evaluation circuit 127 are applied to the gain compensators 814, 815, 816 and 817 in FIG. 8 thereby to control the tap gain ratio. The tap gain control signal with the tap gain thereof controlled is applied to each tap gain controlled circuit of the equalizer. Further, the delay time control signal is applied also to the delay time control circuit.

Figure 14:
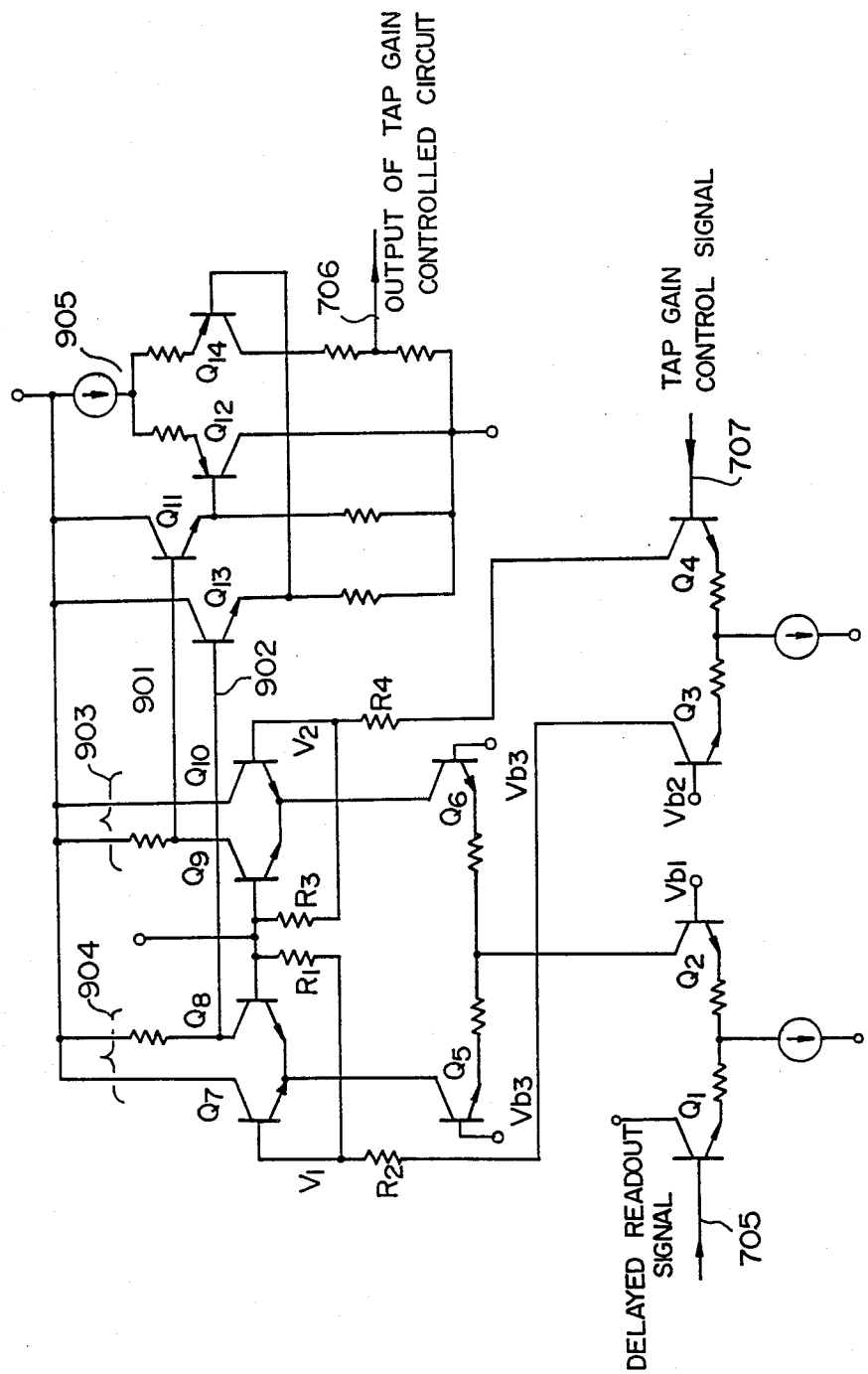
FIG. 14 shows a configuration of a tap gain controlled circuit of an equalizer.

Now, the tap gain controlled circuit of the equalizer will be explained with reference to FIG. 14. The tap gain control signal is produced in positive or negative voltage. If it is produced in a positive voltage, the indication is that the signal is in phase with the delay readout signal providing a delay circuit output signal, while if it is a negative voltage, the signal is in opposite phase to 705. The delay readout signal 705 is thus applied to the base of $Q_1$. The tap gain control signal 707, on the other hand, is applied to the base of $Q_4$. Also, the base bias voltage $Vb_2$ of $Q_3$ is set to 0 V. The operation of each part will be explained with reference to a case in which a positive voltage is applied as the tap gain control signal 707. Since a positive voltage is applied as 707, more current tends to flow on $Q_4$ side in the differential amplifier made up of $Q_3$ and $Q_4$. Specifically, more current flows on the route connected with the collector of $Q_4$ through resistors $R_3$ and $R_4$ from Vs level. If the resistance $R_1$ is rendered equal to $R_3$ and the resistance $R_2$ equal to $R_4$, the voltage level of $V_2$ is reduced more than that of $V_1$. On the other hand, in spite of the fact that the signal current supplied to 903 and 904 is divided by $Q_5$ and $Q_6$, $V_2$ is reduced in voltage level than $V_1$, so that more signal current flows in $Q_9$ than in $Q_8$. As a result, the signal amplification factor is higher for $Q_9$. Also, the output signals of $Q_8$ and $Q_9$ are in phase with the delay readout signal 705. The signal amplitude at the base $Q_{12}$ side of the differential amplifier 90 is larger than that at the base on $Q_{14}$ side. As a consequence, the tap output readout signal 706 takes a form in phase with $Q_{12}$. Specifically, the tap output readout signal 706 in phase with the delay readout signal 705 is produced. Also, when the tap gain control signal 707 is supplied with a negative voltage signal, more signal current flows in $Q_8$ than in $Q_9$ through the same process as mentioned above. The result is that the signal amplification factor on $Q_8$ side becomes higher, so that the signal amplitude for the base on $Q_{14}$ side is larger than that on $Q_{12}$ side. A signal in opposite phase to $Q_{14}$ appears at the tap output readout signal 706. Specifically, the tap output readout signal 706 in opposite phase to the delay readout signal 705 is produced. The signal gain corresponding to the tap gain depends on the magnitude of the voltage of the tap gain control signal 707.

Further, the respective tap output readout signals 706 are added to each other at the adder circuit 708 of the equalizer to obtain an equalized waveform 121 through a low-pass filter 112.

In the above-mentioned configuration, the operation is performed at least once or more to converge the equalization coefficient. The equalization coefficient of each register thus converged is stored in the equalization coefficient memory 109. When the same track selected again, the equalization coefficient is read out of the equalization coefficient memory 109 by the track address signal 7 and is set in each register. In this way, the equalization characteristic is readjusted to maintain the optimum equalization characteristic.

Figure 15:
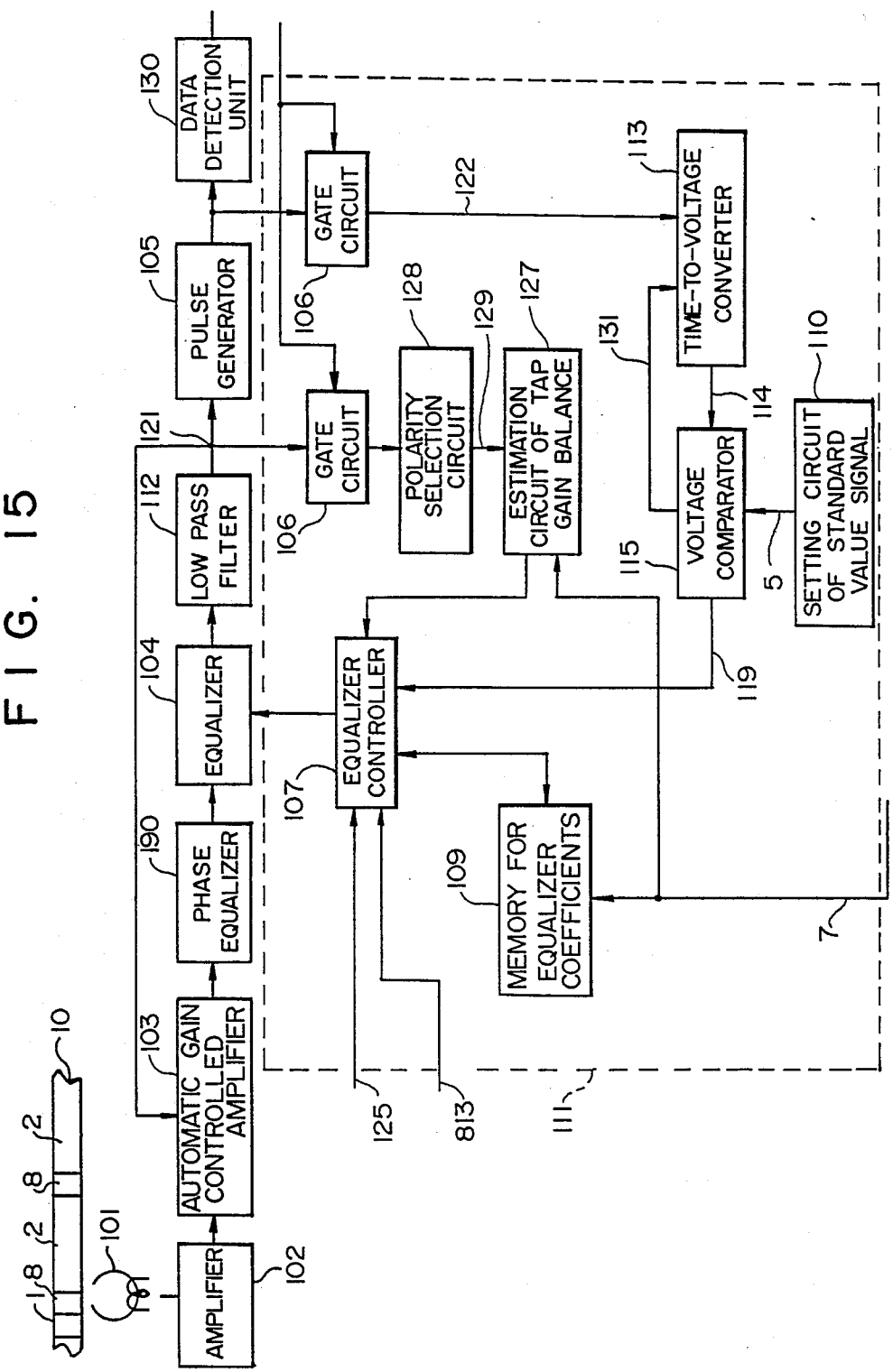
FIG. 15 is a diagram showing a configuration of a readout circuit according to a second embodiment.

A second embodiment will be explained with reference to FIGS. 15, 16 and 17. The features of this embodiment follow. Explanation will be made with reference to a case in which the distortion of the phase characteristic of the head and the circuit is so large as to distort the readout waveform. A fixed distortion of the circuit system is eliminated in advance by a phase equalizer 190 to produce an isolated pulse waveform of FIG. 16 which has symmetric leading and trailing edges. The resulting effect is that the optimum equalization coefficient can be determined in a shorter time.

The difference of the configuration of this embodiment from that of the first embodiment is that this embodiment further comprises a phase equalizer circuit 190 inserted in the readout circuit. Also, when an isolated pulse waveform is symmetric, there is no difference in positive and negative amplitudes of a dibit pattern waveform as shown in FIG. 17, with the result that the amplitude detectors 116 and 117 in the equalization coefficient evaluation circuit 111 may be eliminated, thus simplifying the configuration.

Figure 4:
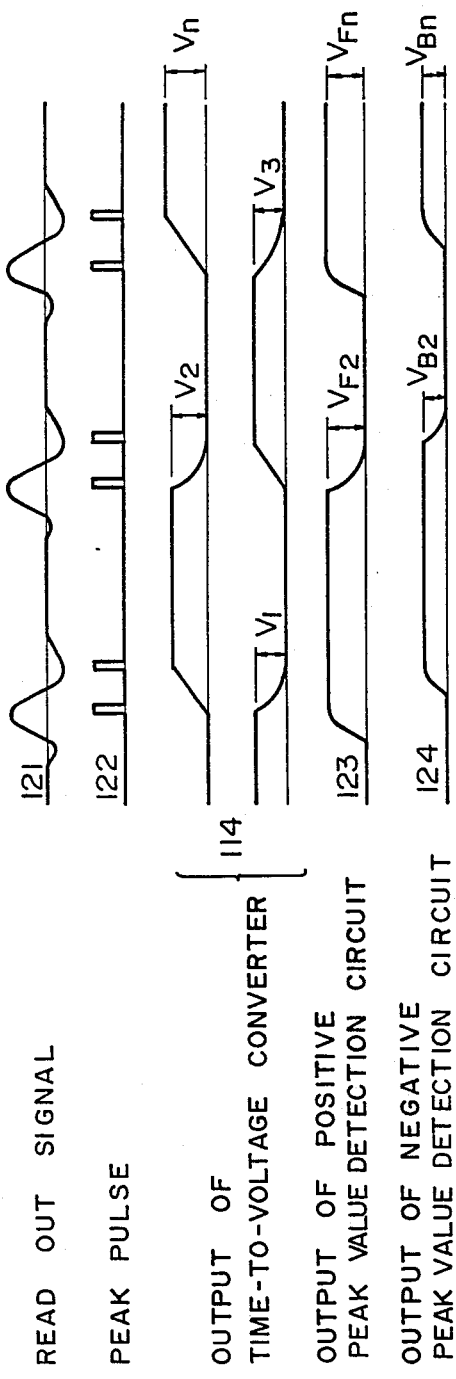
FIG. 4 is a diagram showing a time chart according to the embodiment of FIG. 2.

The difference in operation of this embodiment from that of the first embodiment will be explained. In changing the equalization coefficient, only the classification (I and II) relating to the error value signal for equalization in FIG. 7 may be taken into consideration. Specifically, the equalizer controller 107 requires the operation of a control circuit for the error value signal for equalization Va120. Also, the signal 131 (time-level conversion circuit reset signal) that has returned to the time-level converter 113 from the level comparator 115 has the advantages mentioned below. Comparison between the time chart of FIG. 4 for the first embodiment with the time chart of FIG. 17 for the second embodiment indicates the necessity of two circuits for the first embodiment to convert time into voltage level. This is by reason of the fact that the resetting of the time-voltage level converter used for evaluating a first dibit pattern is overlapped on the evaluation of a second dibit pattern.

In the second embodiment, however, a reset signal 131 is produced before the evaluation of the second dibit pattern after the evaluation of the first dibit pattern, and therefore the time-level converter is always reset before the evaluation. As a result, only one time-level converter is required.

Figure 18:
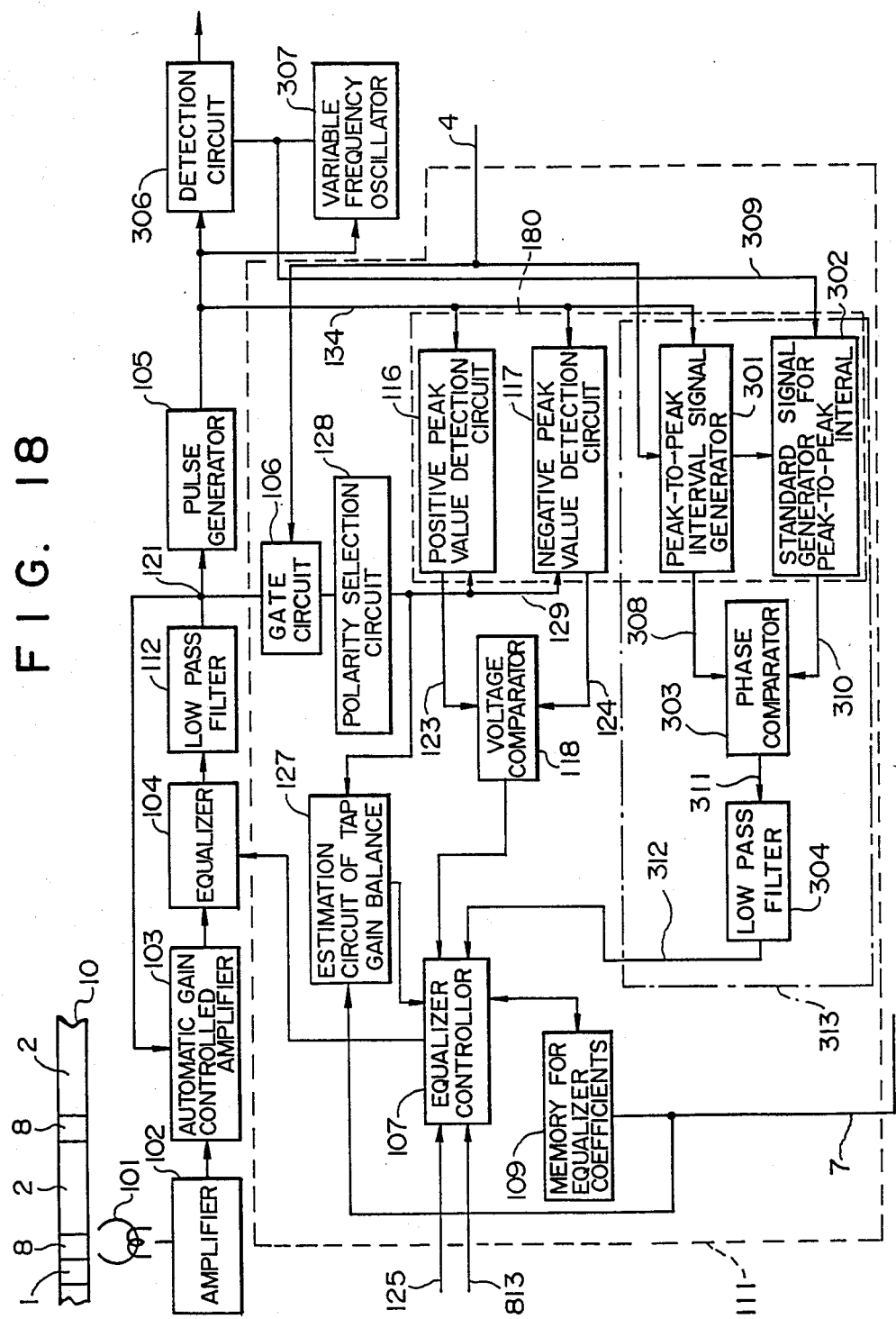
FIG. 18 is a diagram showing a configuration of a readout circuit according to a third embodiment.
Figure 19:
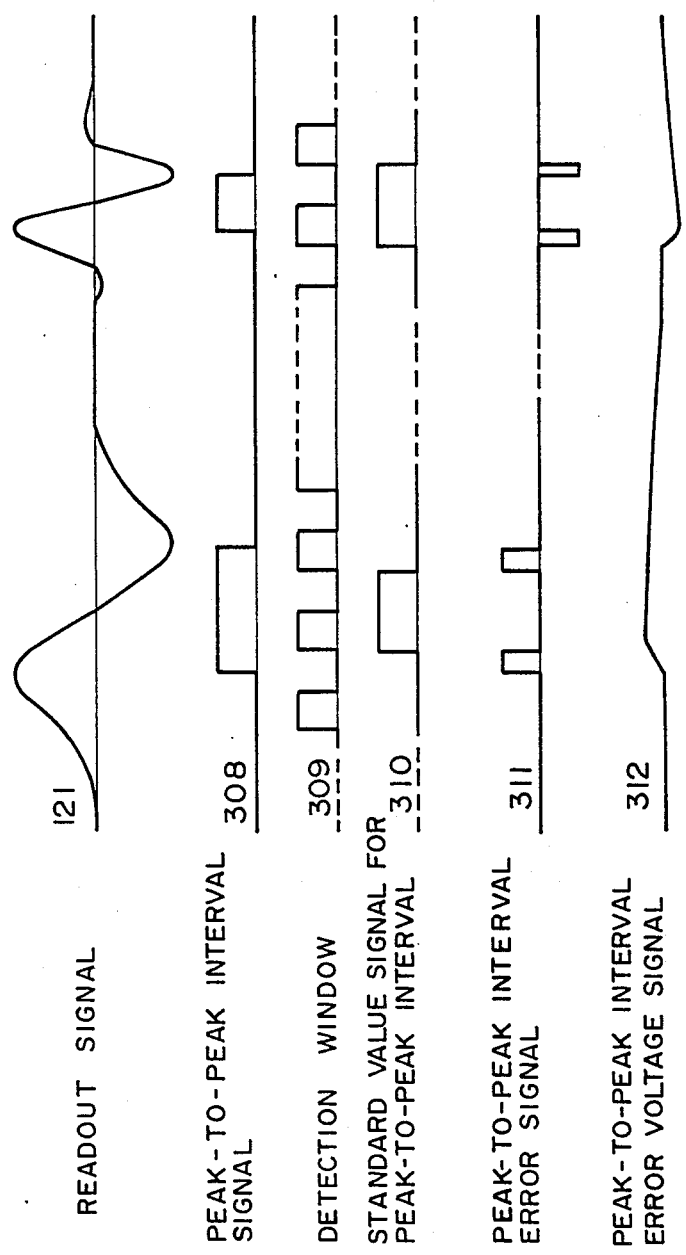
FIG. 19 is a time chart for the embodiment of FIG. 18.

A third embodiment will be explained with reference to FIGS. 18 and 19. One feature of this embodiment lines in the fact that the optimum equalization coefficient can be obtained even when the rotational variations of the disk is large. Further, the embodiment will be compared with the first embodiment for explanation. Unlike in the first embodiment in which the time is converted into voltage level at the time-level converter 113 in order to determine peak intervals, the embodiment under consideration is such that as shown in FIG. 19, peak intervals are represented by the width of "H" level (peak interval signal 308) of a logical circuit. Also, instead of using a voltage level corresponding to the correct peak interval determined by the system conditions as in the first embodiment, the embodiment under consideration uses as a reference a detection window signal 309 for determining "1" or "0" data from the readout signal. Further, for comparison with a reference signal, the first embodiment is such that the level difference from a reference voltage level is detected to provide an error value signal for equalization, whereas in this embodiment, the displacement between the peak internal signal 308 and a peak interval reference signal 310 produced from the detection window signal 309 to provide a peak interval error signal 311. These are main features of this embodiment. The effect obtained from these features will be explained. In the first embodiment, the rotational variations causes a large variation in voltage level corresponding to the peak interval, thereby requiring a long time before the optimum equalization coefficient is determined. According to the embodiment under consideration, on the other hand, the detection window signal used as a reference signal has a function to follow rotational variations, which though large, is slow in speed. As a result, the variation in peak interval error is reduced thereby making it possible to determine the optimum equalization coefficient within a short time.

The difference between this embodiment and the first embodiment will be explained. The embodiment under consideration is different from the first embodiment in the peak interval evaluation circuit of the waveform evaluation circuit 180, that is, the part designated by numeral 313 in FIG. 18. The configuration and operation of the part 313 will be explained. First, while the gate signal 4 is closed, flip-flops 451, 452 of a peak interval signal generator 301 are reset. When the gate signal 4 opens, the flip-flops 451, 452 wait for input, that is, a test data peak pulse 134. With the arrival of a peak pulse representing the front side of a dibit pattern, the set input S of 452 is triggered and the Q output thereof becomes "H" level. When a peak pulse on the rear side arrives, the reset input R of 452 is triggered so that the Q output is reduced to "L" level. Specifically, the peak interval of a dibit pattern is converted into the time interval of "H" levels. On the other hand, a peak interval reference signal generator 302 generates a peak interval reference signal 310. In the present embodiment showing the use of a 1-7 modulation method, the peak interval of the dibit pattern is covered by two detection windows. When the peak interval signal 308 is at "H" level, an AND circuit 453 opens to pass a detection window signal 309. Further, the AND circuit 456 waits for the first leading edge of the detection window signal 309, and when it is applied thereto, triggers the set input S of a flip-flop 455 to raise the Q output to "H" level. At the same time, the complementary output of Q becomes "L" level, thus closing the AND circuit 456. Since the Q output of the flip-flop 455 is at "H" level, on the other hand, the AND circuit 454 opens to pass the detection window signal 309. The flip-flop 455 is reset at the trailing edge next to the detection window signal 309. A flip-flop 457 is used for control to produce the peak interval reference signal only once. This flip-flop 457 so operates that the clock of 457 is triggered when the Q output of 455 becomes "H" level thereby to reduce the complementary output of Q to "L" level. As a result, the AND circuit 456 is closed. This condition is sustained until the reset signal 458 is produced. The reset signal 458 is produced as a pulse as soon as the complementary output of Q of the flip-flops 452, 455 becomes "H" level.

Figure 20:
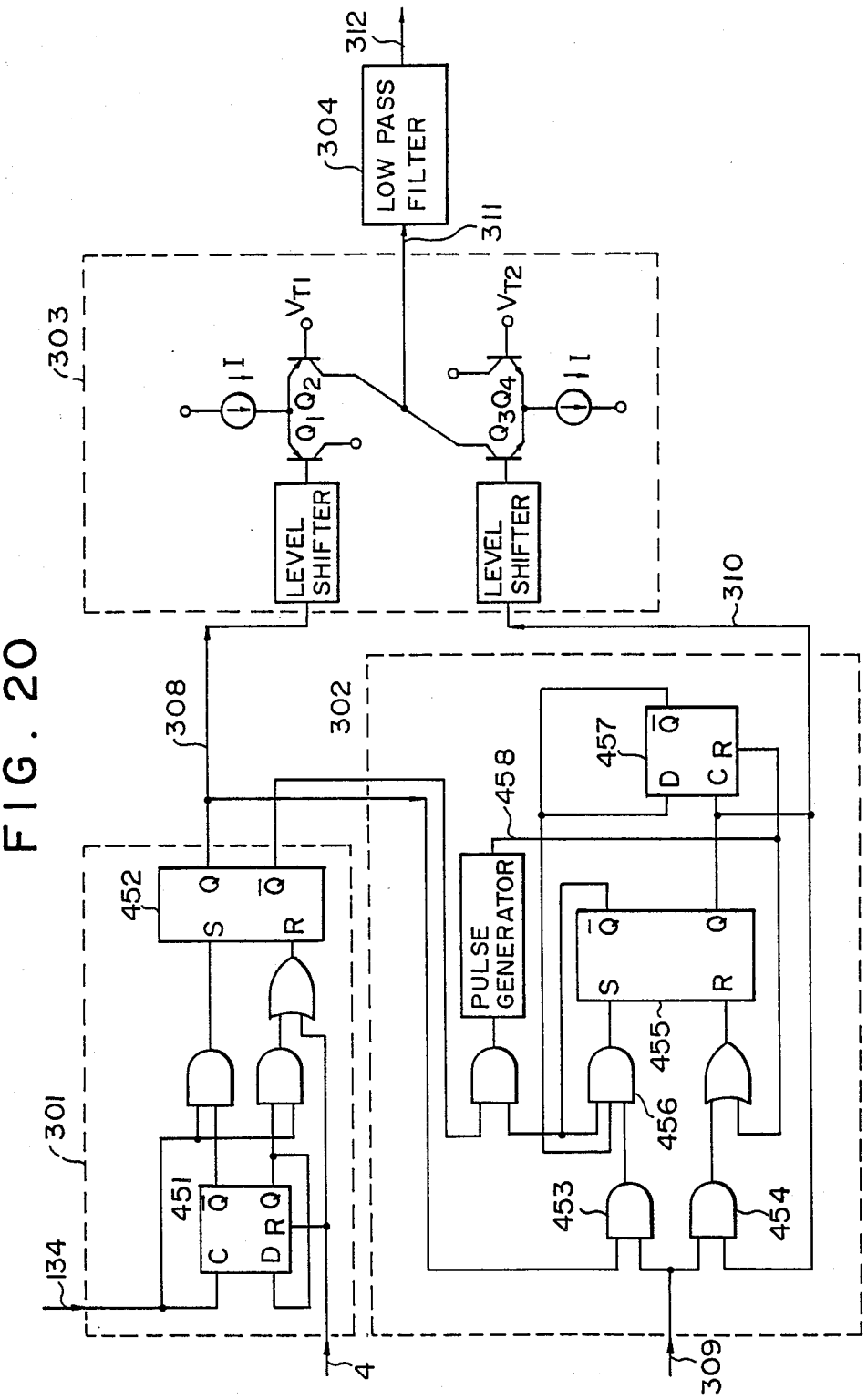
FIG. 20 is a diagram showing a peak interval evaluation circuit of the embodiment shown in FIG. 18.

Further, a peak interval signal 308 produced as an output from the peak interval signal generator 301 and a peak interval reference signal 310 produced from the peak interval reference signal generator 302 are applied to a phase comparator 303 to produce a peak interval error signal 311. The phase comparator 303 is provided in two types. The circuit shown in FIG. 20 is to take out the error signal 311 as a current pulse. This circuit operates as follows. In a current switch circuit made up of $Q_1$ and $Q_2$, assume that 308 is at "L" level. The current I flows on $Q_2$ side. In a current switch circuit comprising $Q_3$ and $Q_4$, on the other hand, the current I flows on $Q_4$ side when 310 is at "L" level and on $Q_3$ side when "H" level. In other words, the output current of 311 is determined by a combination of 308 and 310 levels. Such a combination is obtained as follows. When both 308 and 310 are at "L" level, the output is zero. When 308 is "H" level an 310 at "L" level, the current I flows out. When both 308 and 310 are at "H" level, the output zero. When 308 is "L" level and 310 at "H" level, the current I flows in. This peak interval error signal 311 is applied to a low-pass filter 304 to produce a peak interval error level signal 312.

Figure 21:
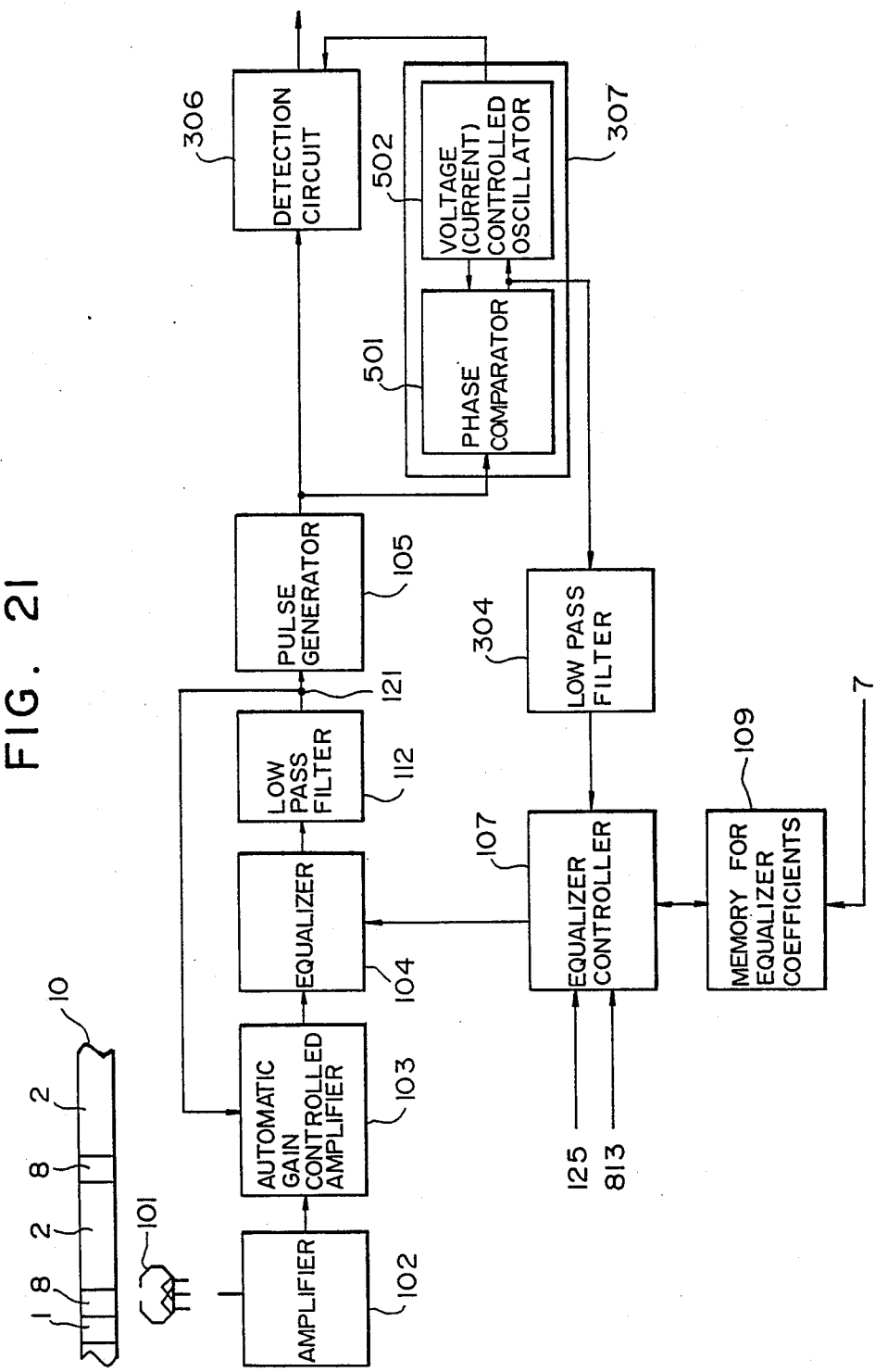
FIG. 21 is a diagram showing a configuration of the readout circuit according to a fourth embodiment.

A fourth embodiment will be explained with reference to FIG. 21. The features of this embodiment are discussed below. The peak interval error signal 311 which is the function of the parts 301, 302 and 303 in the first embodiment is replaced by a phase error signal of a variable frequency oscillator (VFO) 307. In this embodiment, it is also possible to monitor a peak shift during data readout. Further, the effect is improved by combining this embodiment with other embodiments.

The configuration of this embodiment will be explained. First, the variable frequency oscillator (VFO) is so configured that an output phase of a voltage (current) controlled oscillator 502 is compared with an output phase of a pulse generator 105 at a phase comparator 501, and an error, if any, between them is returned to 502 as a phase error signal. The voltage (current) controlled oscillator 502 changes the oscillation frequency with reference to the error signal. This process is repeated to eliminate the phase difference. In this embodiment, the phase error signal of the variable frequency oscillator (VFO) is partly picked up and applied to the equalization controller 107.

Figure 22:
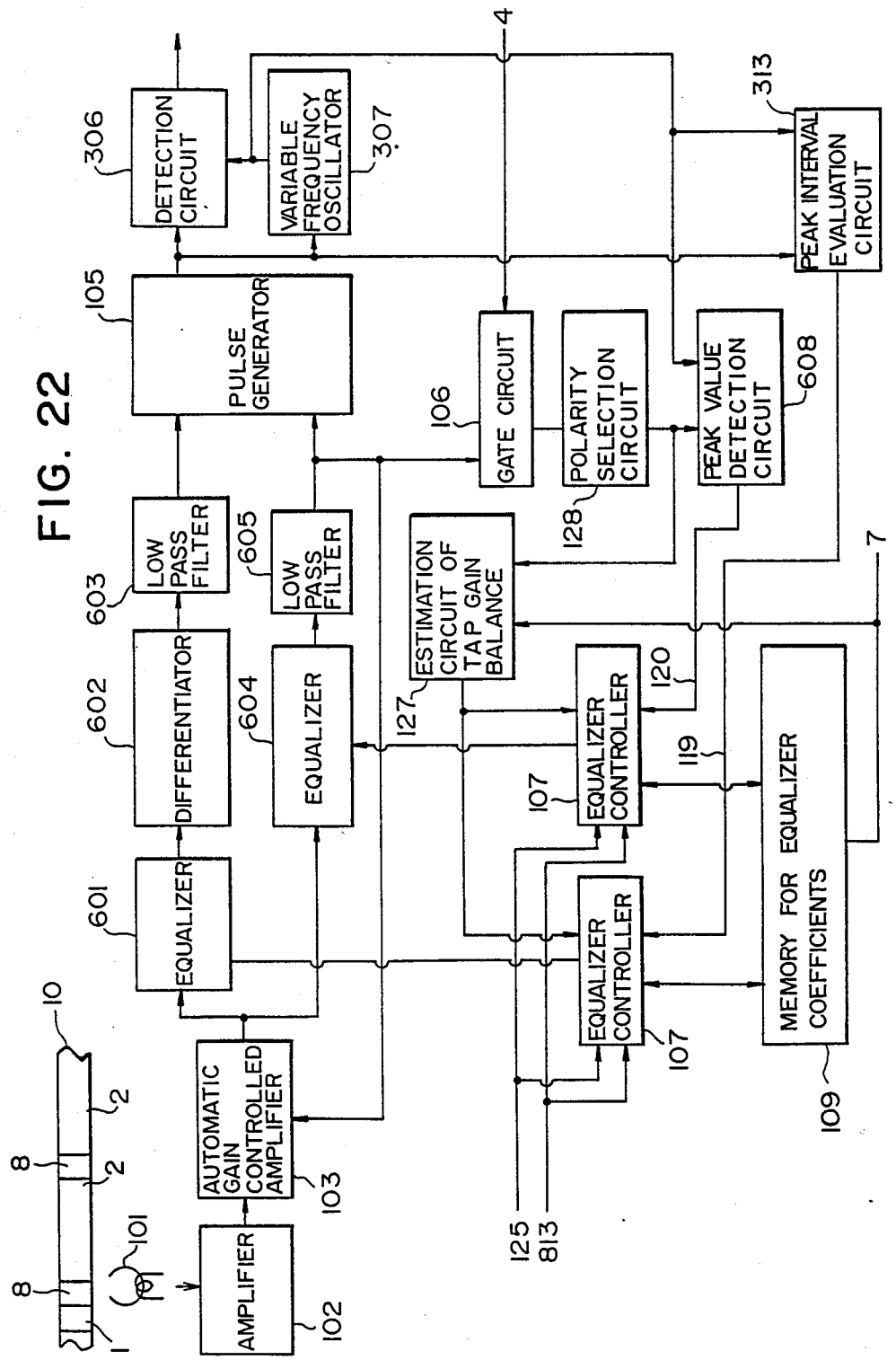
FIG. 22 is a diagram showing a configuration of the readout circuit according to a fifth embodiment.

A fifth embodiment will be explained with reference to FIG. 22. The feature of this embodiment is as follows. In addition to the functions of the fourth embodiment, the present embodiment performs the functions mentioned below. An exclusive equalizer is inserted in each of systems handling a linear signal and a differentiation signal of a readout waveform required for producing a peak pulse in a pulse generator 105. This configuration permits each signal to be equalized into an optimum signal. Further, a peak shift can be constantly monitored during data readout as in the fourth embodiment. In addition, a combination with other embodiments improves the effect of this embodiment.

Figure 23:
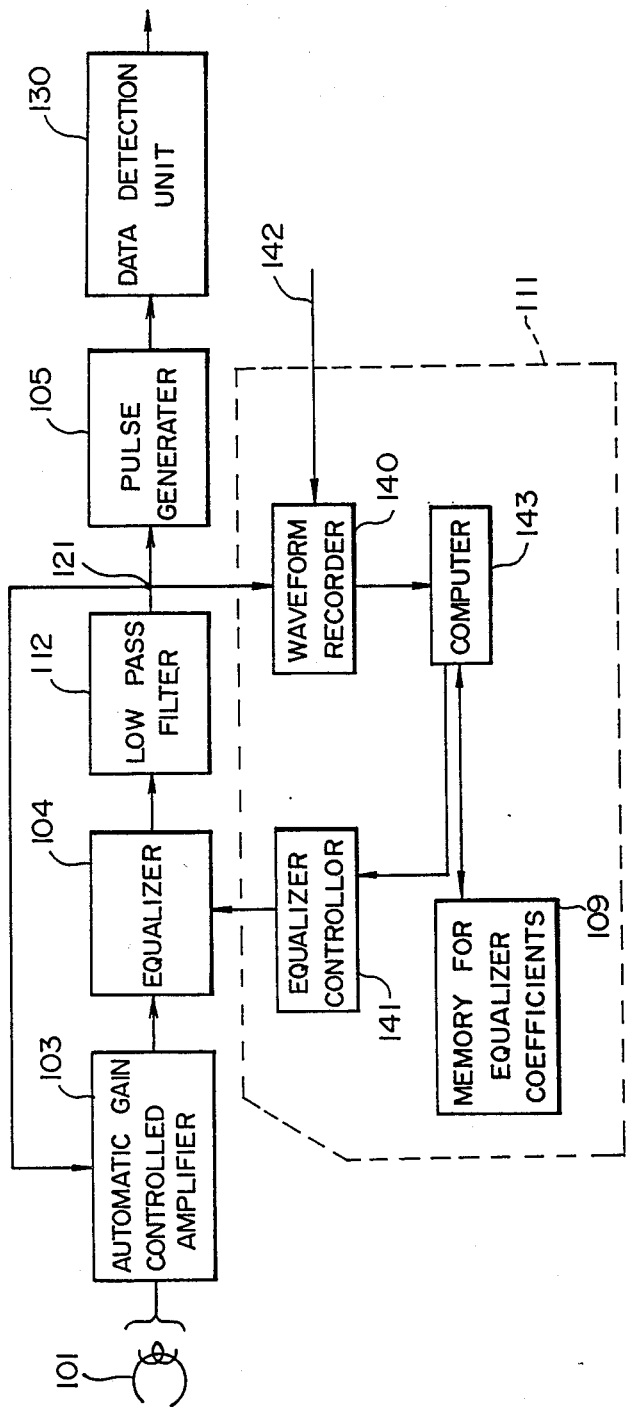
FIG. 23 is a diagram showing the readout circuit according to a sixth embodiment for determining the optimum equalization characteristic by calculations.

The processes employed in the first to third embodiments may be executed by a computer. An example of such operation is shown in FIG. 23. First, the latest equalization coefficient read out of an equalization coefficient memory 109 is set in an equalizer 104. After that, a signal read out of the magnetic head 101 is applied through an automatic gain control circuit 103 to the equalizer 104, and the automatic gain control circuit 103 is operated to maintain constant the amplitude of the waveform 121 after equalization. A clock strobe signal 142 is applied for taking a waveform into a waveform memory circuit 140. The waveform thus stored is taken into the computer 143 thereby to compute an equalizer coefficient by the computation processes mentioned later. The parts of this embodiment corresponding to the equalizer coefficient evaluation circuit 111 in the abovementioned embodiment include an equalizer controller 141, a waveform memory circuit 140, a computer 143 and an equalization coefficient memory 109. In order to eliminate waveform distortion due to noises, on the other hand, it is effective to average out by repeating the waveform applications several times.

Figure 24:
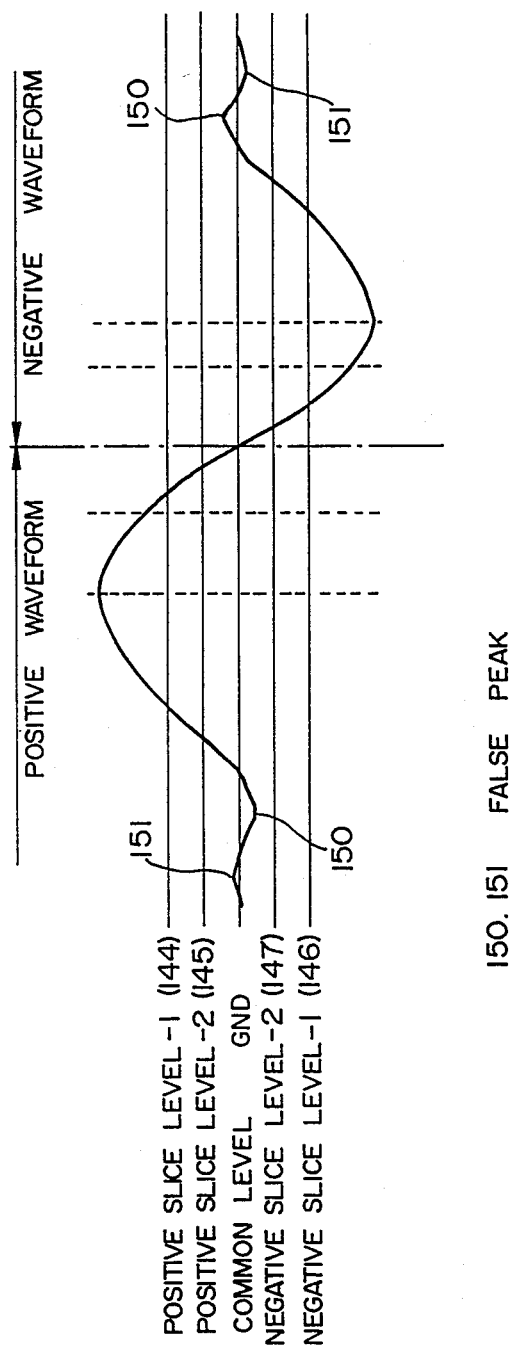
FIG. 24 is a diagram showing a slice level providing a condition for decision.
Figure 25:
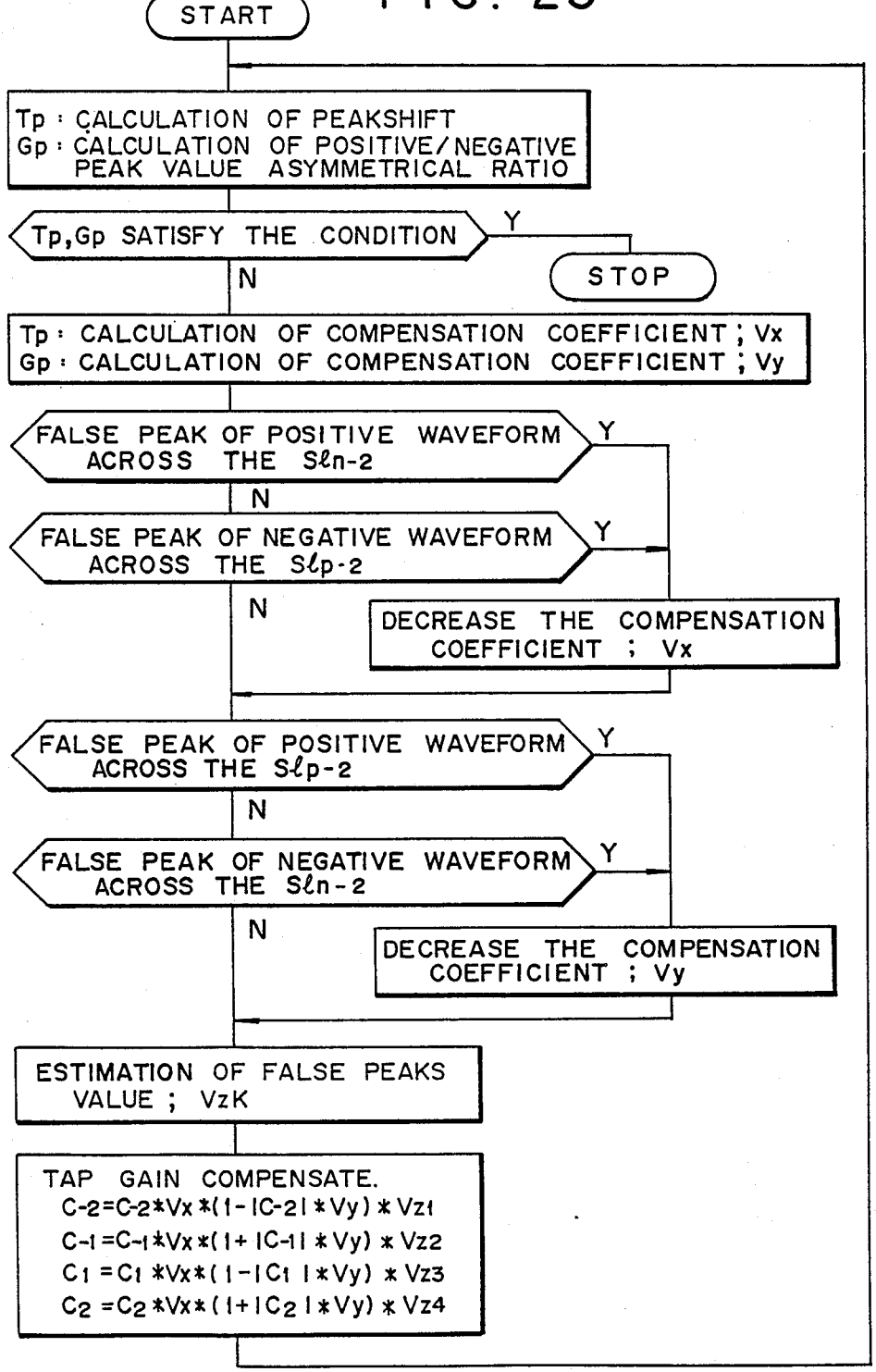
FIG. 25 is a diagram showing a calculation algorism according to the embodiment of FIG. 23.

An embodiment showing the computation processes will be explained with reference to FIGS. 24 and 25. In this embodiment, an equalization coefficient, or a tap gain in particular, is obtained from a dibit waveform. As slice levels for computation, the positive side has two levels 144, 145, and the negative side two levels 146, 147. The slice levels 144 and 146 are used for preventing detection of a false peak in order to detect a true peak of a waveform, and 145 and 147 for monitoring to prevent dispersion of equalization coefficients. A peak shift and positive/negative peak value asymmetrical ratio are computed, and if a setting (conditions for convergence) is met, the computed equalization coefficient is set in the equalizer 104. If the setting is not met, by contrast, the computation mentioned below is repeated. The peak interval of the waveform is compared with a reference peak interval to determine a compensation factor Vx. On the other hand, the waveform amplitudes of positive and negative peaks are compared with each other to determine a compensation factor Vy. If the tap gains $C_{-1}$ and $C_1$ including signs are too small, an understood such as 150 is produced. If the understood exceeds the slice levels 145 and 147 in magnitude, an overcompensation is indicated and the compensation factor is required to be reduced. If the tap gains $C_{-2}$ and $C_2$ including signs are too large, by contrast, a false peak as shown by 151 is produced. If the magnitude of this false peak exceeds the slice levels 145, 147, an over-compensation is considered to have occurred, thereby making it necessary to reduce the compensation factor. Further, as explained with reference to FIGS. 10 and 12, relative magnitudes of false peaks are also evaluated to compute each tap gain ratio. By controlling the compensation values of tap gains in the manner mentioned above, the equalizer coefficients are corrected. The equalization coefficients thus corrected are used to compute a peak shift and a positive/negative peak value asymmetrical ratio again. The effect of this embodiment is that a waveform may be taken in only once in order to determine the optimum equalization coefficient.

Figure 27:
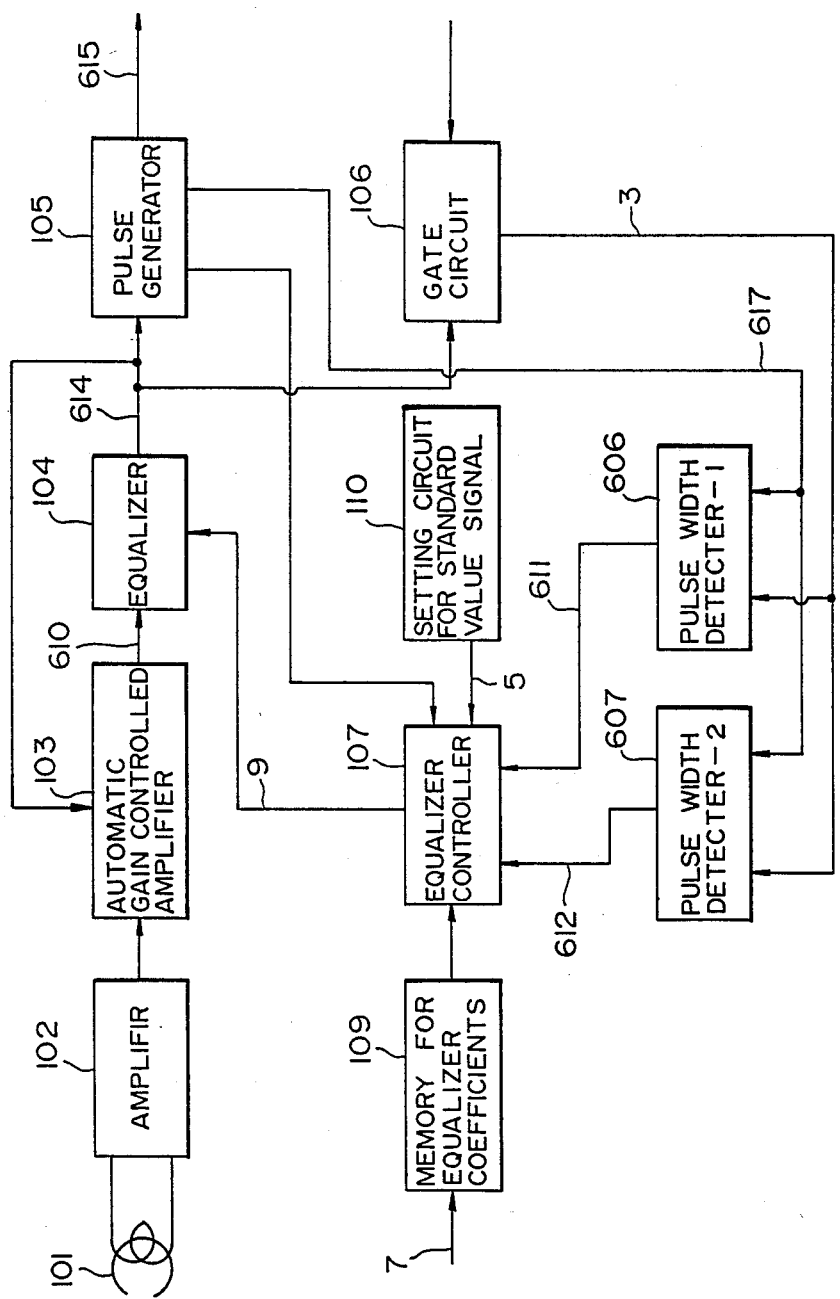
FIG. 27 is a diagram showing a seventh embodiment.

Still another embodiment of the invention is shown in FIG. 27. In this embodiment, a signal is recorded to provide a readout waveform as an isolated pulse waveform for a test data 8. The test data 8 is read out to detect the width at a plurality of amplitude levels, and the error from the width of an ideal isolated pulse waveform is determined to compensate for the equalization coefficient. The width of an ideal isolated pulse waveform is determined in the manner mentioned below.

Figure 26:
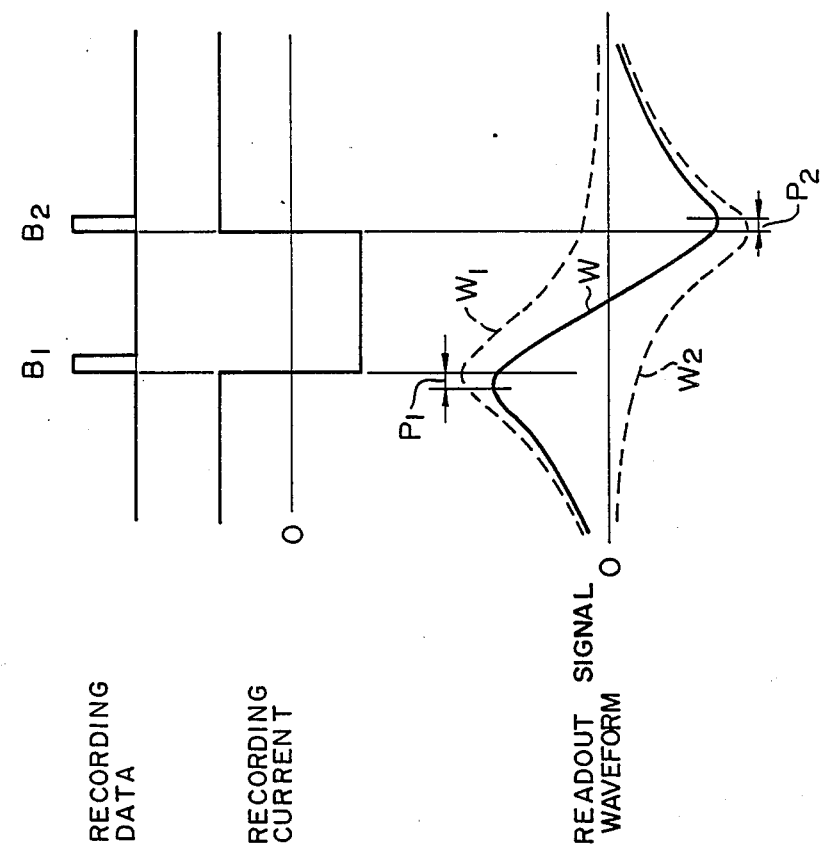
FIG. 26 is a diagram schematically showing a patter peak shift.

Generally, if an isolated pulse waveform $W_1$ has the same amplitude as a combined waveform W, there is no waveform interference and no peak shift is caused. (See FIG. 26) Assume that a readout waveform is equalized into a waveform having a spectrum of an ideal waveform such as expressed as $$V(f) = \cos^2\left(\frac{\pi f}{2fc}\right) \tag{1}$$

A time expression of (1) is given as $$f(t) = \frac{1}{1 - 4t^2 fc^2} \cdot \frac{\sin(2\pi fct)}{2\pi fct} \tag{2}$$

When this expression is used, it is seen that if the amplitude of the isolated pulse waveform $W_1$ is to be equal to that of the combined waveform W, it is necessary that the frequency fc is double the maximum recording-readout frequency (determined from the transfer speed and modulation system) used in the system. Also, the width of the waveform is required to be equal to about the minimum bit interval bit at 50% amplitude point of the isolated pulse waveform ($PW_{50}$) and about 1.3 times the minimum bit interval at 20% amplitude point ($PW_{20}$) of the waveform.

The operation of this embodiment will be explained below with reference to FIGS. 27, 28 and 29. The data recorded in a medium (not shown) is read at a magnetic head 101, and after being amplitude at an amplifier 102, is further amplified at an automatic gain controlled amplifier 103 into a waveform 610 having a fixed amplitude not depending on the head, medium or disk radius in order to detect a correct pulse duration of the waveform. The amplified waveform 610 is applied to an equalizer 104 from which an equalizer output 614-1 is produced, which output is applied through a gate circuit 106 to a plurality of (two) pulse duration detectors 606 and 607 for detecting the pulse duration of the waveform. The pulse duration detectors 606 and 607 detect the pulse duration of an equalizer output with a predetermined amplitude and produce pulse duration detection signals 611 and 612.

Generally, the waveform 610 read from the head takes an asymmetrical form due to the phase distortion or the different thicknesses of upper and lower poles of the thin film head. In order to compensate for this asymmetry, the embodiment comprises means for detecting the duration separately for the right and left parts of an isolated pulse waveform. If the asymmetry is small or lacking, the duration is detected as a sum of the durations of the right and left parts from the center.

These pulse duration detection signals 611, 612 and a target pulse duration signal set in a reference signal setting circuit 110 are used to generate an equalizer control signal 9 at the equalizer control circuit 107. An embodiment of the pulse duration detection circuits 606 and 607 will be explained later in this specification. The equalizer 104 is supplied with an amplified waveform 610, which is produced after being equalized into a waveform 614-2 approximate to a target waveform by the equalizer control signal 9. A peak is detected by a pulse generator 105 from the equalized waveform 614-2 thereby to detect a peak pulse 15 corresponding to a peak point.

This embodiment uses a transversal equalizer 104, and the delay time, coefficient, etc. of the equalizer are set by an equalizer control signal 9 as described later.

Figure 28:
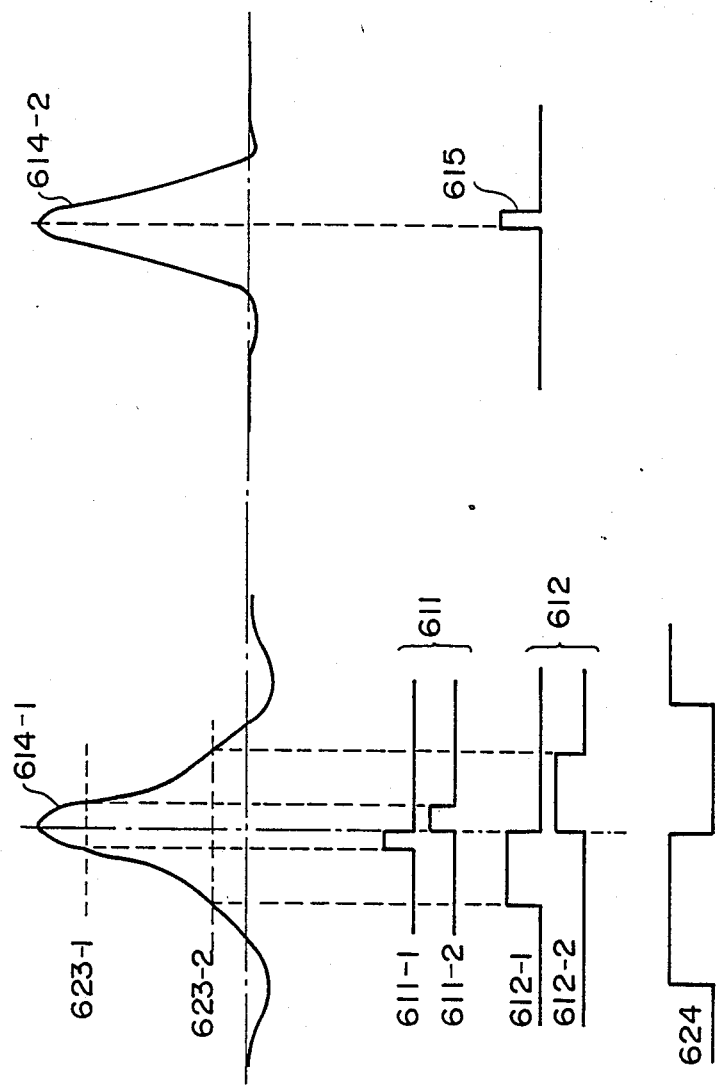
FIG. 28 shows waveforms produced at various parts of a pulse width detector.
Figure 29:
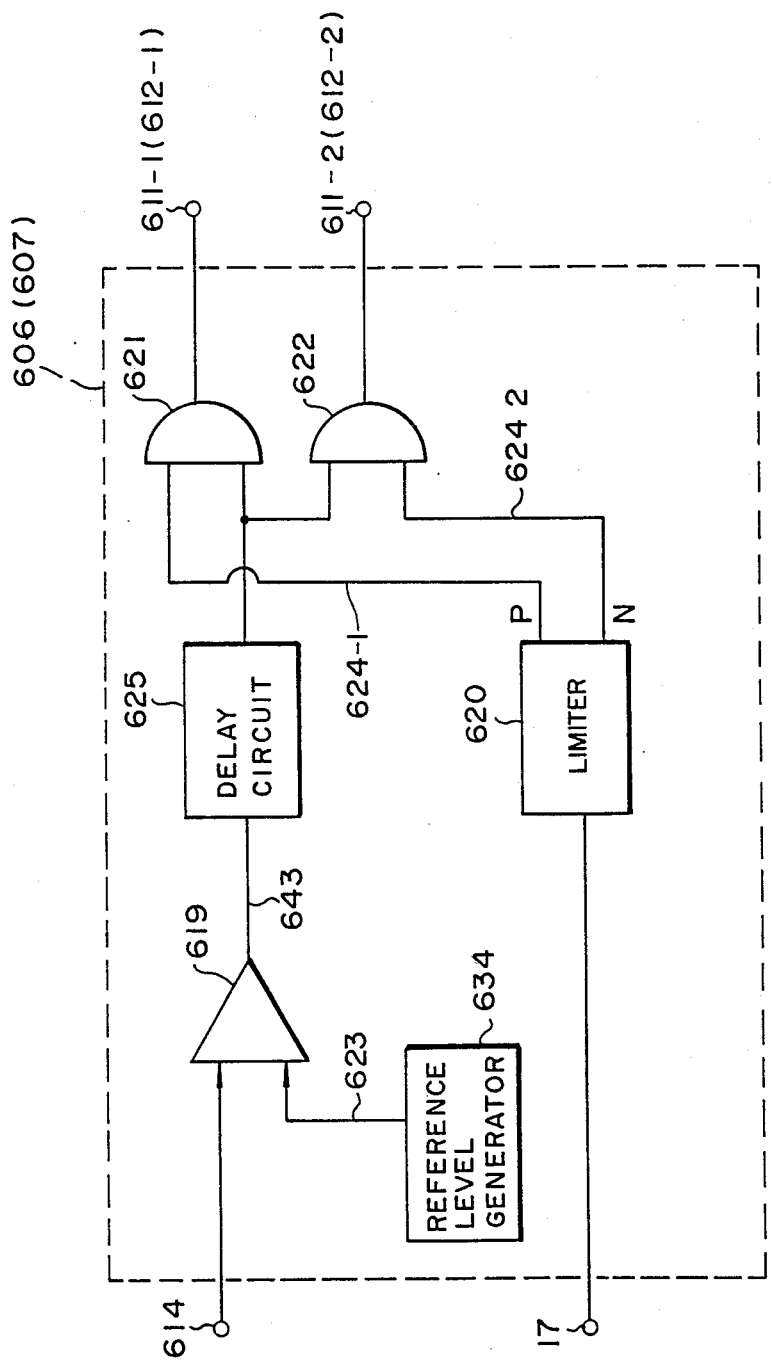
FIG. 29 is a diagram showing pulse width detector according to the embodiment of FIG. 28.

FIG. 29 shows an embodiment of the pulse duration detection circuit, and FIG. 28 a waveform of each part. An output 614-1 of an equalizer is applied to the pulse duration detector 606, 607 through a gate circuit, and when the output exceeds the output amplitude 623 of the pulse duration detection level setting circuit 634, a pulse duration detection signal 643 is produced from a pulse level comparator 619. Since the right and left pulse durations of a waveform are detected separately from the pulse duration detection signal 643 as mentioned above, a differentiated waveform 617 of a head readout waveform is produced from the pulse generator circuit 105. A limiter circuit 620 produces an output 624 shaped from the differentiated waveform 617 or a waveform of the opposite polarity thereto. These waveforms and the pulse duration detection signal 643 are adjusted in timing at a delay circuit 625, and are applied to AND gates 621, 622 respectively, thus producing waveform width detection signals 611-1 and 611-2 corresponding to the width of isolated pulse waveforms on the sides forward and rearward of the center respectively.

Figure 30:
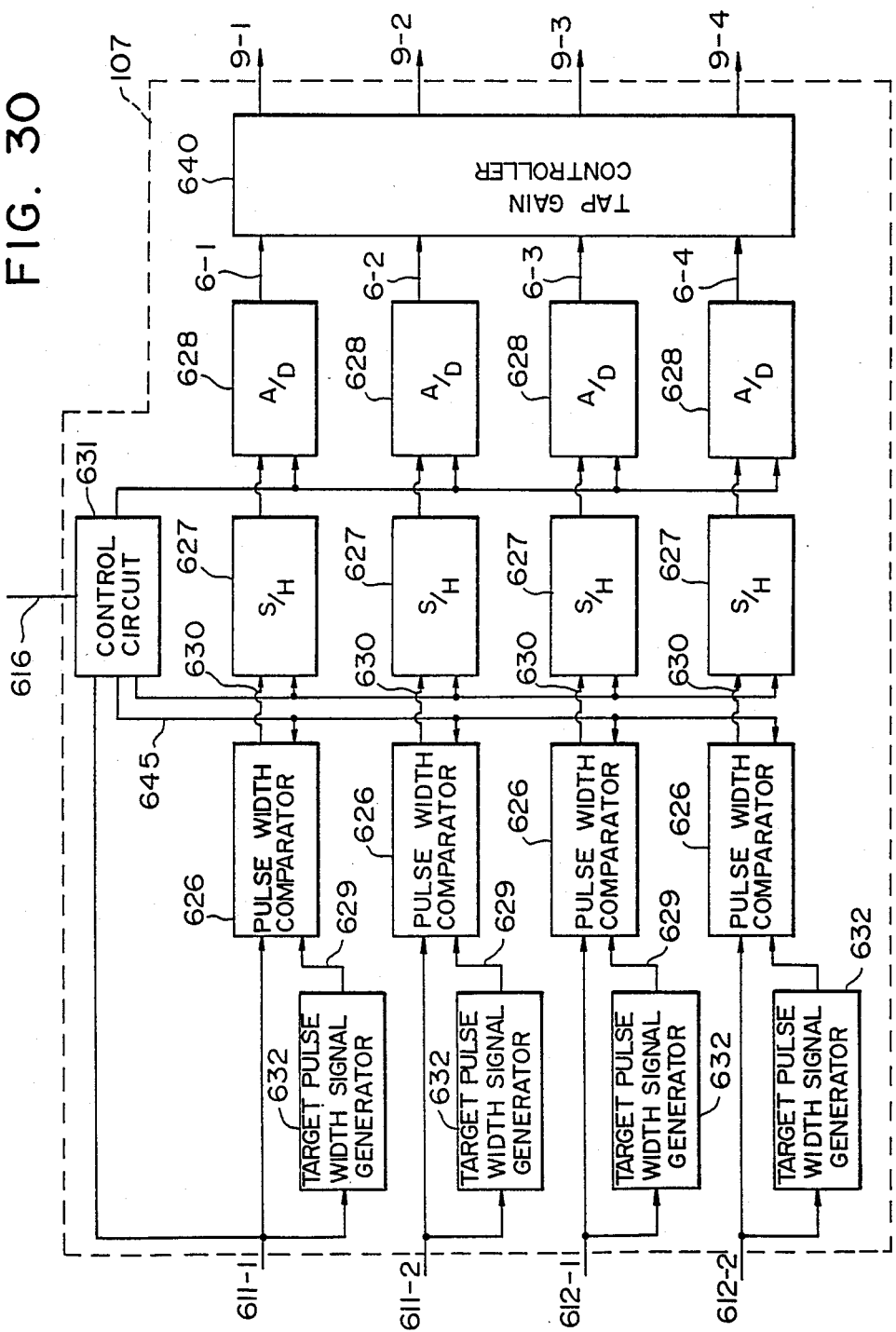
FIG. 30 is a diagram showing an equalizer controller according to the embodiment of FIG. 27.
Figure 31:
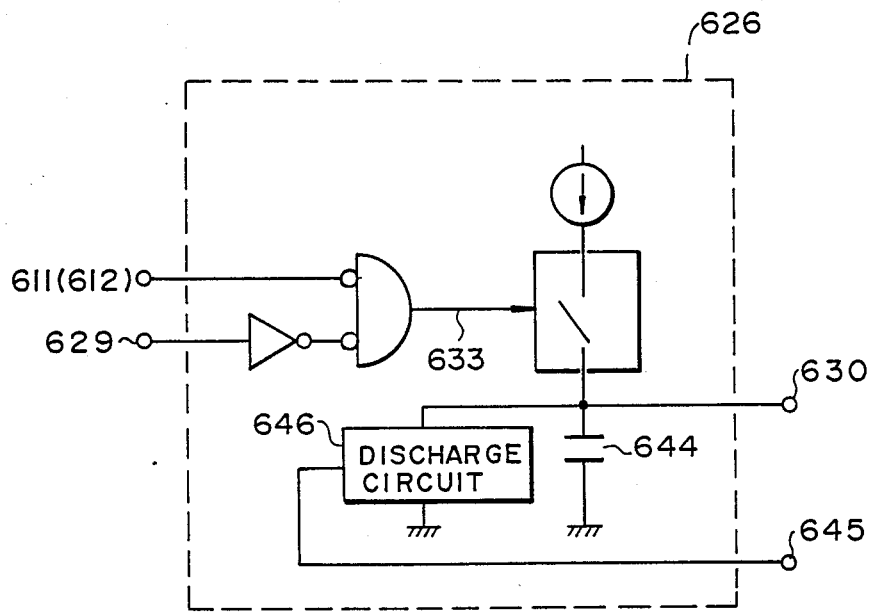
FIG. 31 is a diagram showing a configuration of a pulse width comparator.
Figure 32:
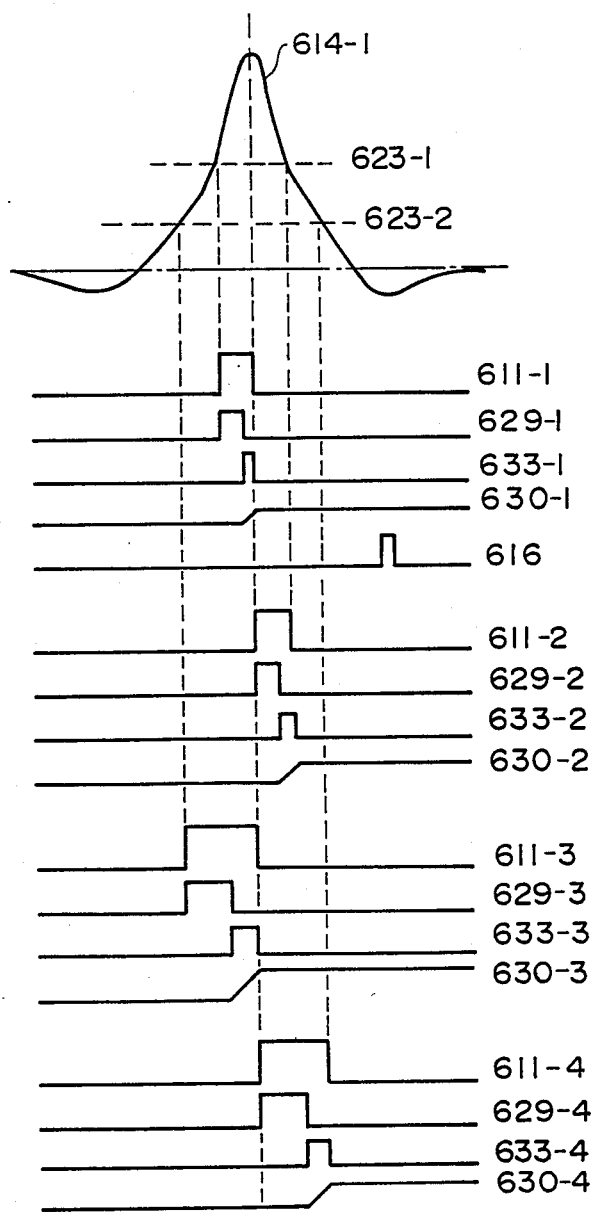
FIG. 32 is a diagram showing waveforms produced in FIG. 31.
Figure 33:
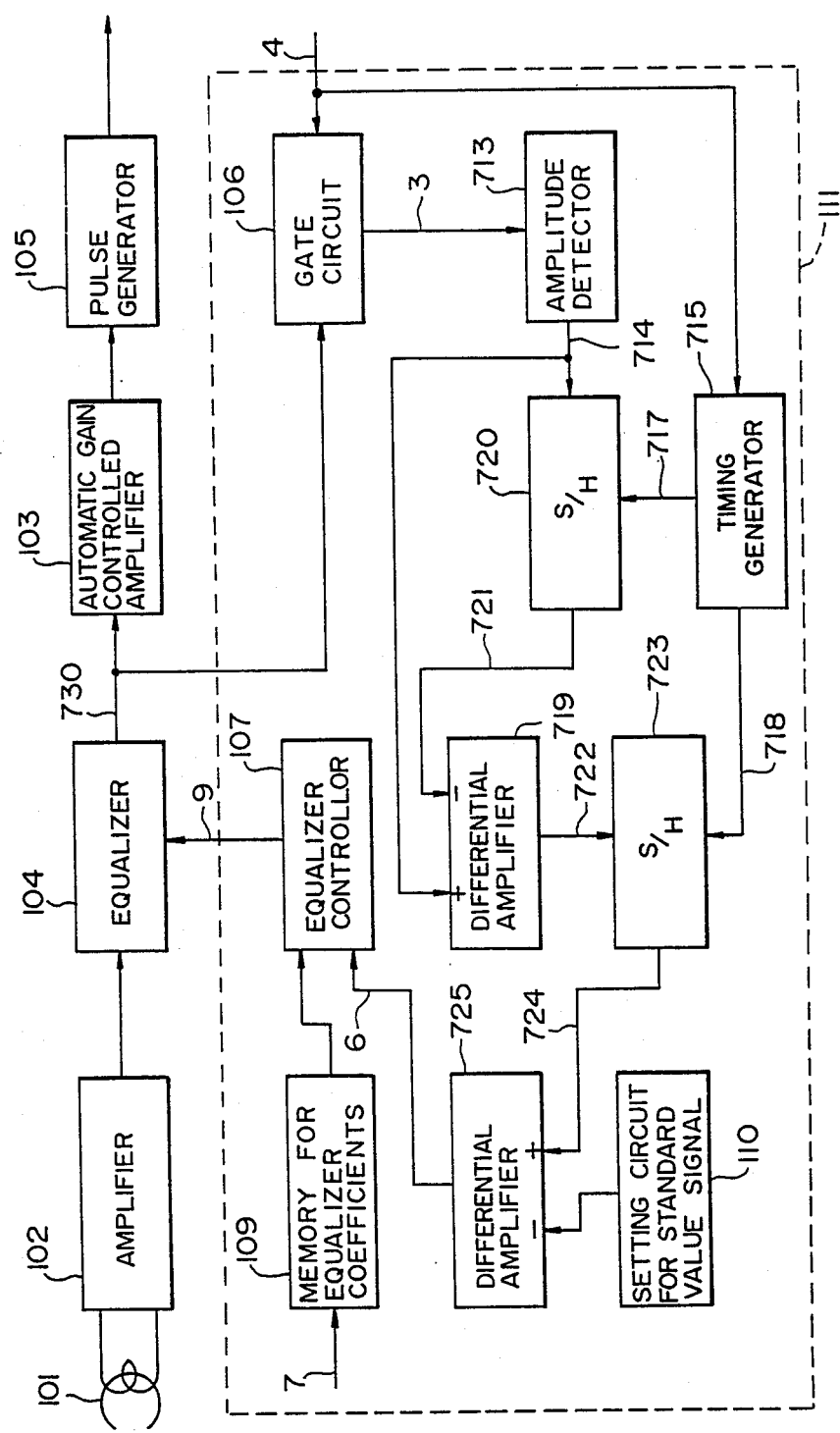
FIG. 33 is a diagram showing an eighth embodiment.

The equalizer control circuit 107 in this embodiment is configured as shown in FIG. 30. This configuration will be explained with reference to FIGS. 31 and 32. This circuit portion includes a target pulse width signal generator 632, a pulse duration comparator 626, a sample hold circuit 627, and A/D converter 628, a control circuit 631 and a tap gain calculator 640. In response to waveform width detection signals 611-1 to 611-2 and 612-1 to 612-2, a target pulse duration signal 629 is produced. In this embodiment, the widths on the right and left sides are compared, and therefore the target pulse duration is one half of the above-mentioned target pulse duration. A well-known monostable multivibrator circuit may be used as a target pulse duration signal generation circuit. The pulse duration comparator 626 is configured as shown in FIG. 33, in which a waveform width detection signal 611 and a target pulse duration signal 629 are converted into a uniform current of a time width 633 at a gate circuit, and further converted into a ramp waveform output 630 at a capacitor 644. The ramp waveform output 630 is produced as a digitized error value signal for equalization 6 in the timing defined by the control signal 616 from the pulse generator circuit 105 by the sample hold circuit 627 and the A/D converter 628. This error value signal for equalization 6 is applied to a gain calculation circuit 40 to produce an equalizer control signal 9 for controlling the equalizer in the manner described below. First, the gains $C_{-1}$ and $C_1$ of the tap gain controlled circuit 703 of the equalizer shown in FIG. 5 are set by error value signals for equalization 6-1 and 602 at a large amplitude level such as the pulse width at 50% amplitude point $PW_{50}$, and the setting is changed sequentially to assure that the error value signals 6-1 and 6-2 become zero. After that, the gains $C_{-2}$ and $C_2$ of the gain setting circuit 703 are set in such a manner that the error value signals for equalization 603 and 604 are reduced to zero. In the case where the waveform is asymmetric, the compensation described below is effected. Specifically, when the front side has a larger width with the error value signals 6-1, 6-3 larger than 6-2, 6-4, the gain $C_{-2}$, $C_{-1}$ of the gain setting circuit are set to a level larger than $C_2$, $C_1$ to produce a waveform output which is progressively symmetric and thinner.

All the error value signals 6 are preferably reduced to zero finally. For practical purposes, however, an error of about 5% of a target pulse duration is allowable. The ramp waveform 630 desirably includes an integration of errors against a plurality (several tens in the present case) of input waveforms in order to eliminate the effect of variation due to noises. For this purpose, the integration time (number of input waveforms) is controlled by a control circuit 631 using an external control signal 616 and a waveform width detection signal 611. Also, the control circuit 631 is used to control the timing of sampling at the sample hold circuit and the A/D conversion at the A/D converter 628. The control circuit 631, on the other hand, is operated to control a discharge circuit 646 of a capacitor 644 by use of a control signal 645, so that after detection of the ramp waveform output 630 by the sample hold circuit 627, the output of the capacitor 644 is restored to zero.

This embodiment has dealt only with the pulse duration detection on one polarity side of an isolated pulse waveform. As well known, however, two sets of similar devices may be used to detect the widths of an isolated pulse waveform of the two polarities.

Instead of the transversal equalizer used in this embodiment, it is desirable to connect a Gaussian low-pass filter in series if the above-mentioned target spectrum waveform is to be obtained. Such a low-pass filter is preferably inserted in the pulse generator circuit 105.

The target pulse duration produced from the target pulse duration setting circuit 632 ideally takes a fixed value over the entire surface of a disk. A difference may be provided between inner and outer peripheries, however, such as by broadening the outer periphery or like means in order to eliminate the undershoot of the equalized waveform 14 which is caused by the high resolution.

A further embodiment of the invention is shown in FIG. 33. As described above, to the extent that the amplitude of the isolated pulse waveform $W_1$ is equal to that of the combined waveform W, no peak shift occurs. In view of this, according to the present embodiment, a signal of a predetermined frequency is recorded as a test data, the test data is read out while monitoring the amplitude thereof in order to correct the coefficients of the equalizer in such a manner as to obtain the same amplitude for the frequency providing an isolated pulse waveform and for the frequency providing a waveform interference. The frequency of a test data is determined in the manner mentioned later. For this purpose, at least two types of frequencies are required; at one a readout waveform is considered as an isolated pulse waveform, and the other providing the minimum bit intervals for the system involved (or near to such a frequency).

Figure 34:
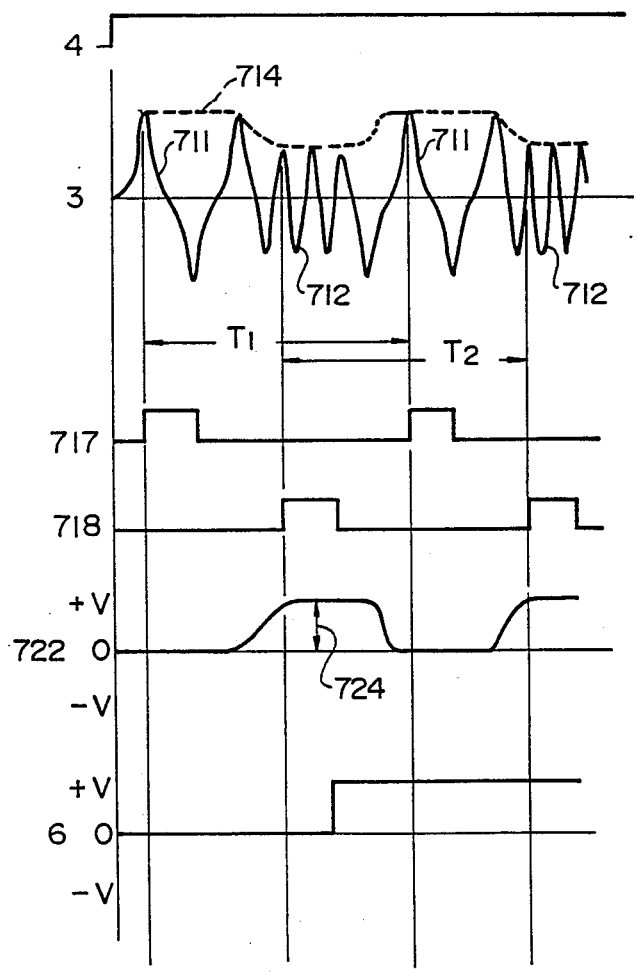
FIG. 34 is a diagram showing operation waveforms produced in the embodiment of FIG. 33.

The operation of the present embodiment will be explained with reference to FIGS. 33 and 34. FIG. 34 is a diagram showing waveforms produced at various parts of the circuit. This present case uses two types of frequency signals 711 and 712 as a test data.

Upon detection of a home address signal 1, the readout test is connected to a detector circuit 713 as a test data signal by a gate circuit 106 to start amplitude detection thus producing a signal 714 proportional to the amplitude of an equalizer output 730. A timing pulse generator 715, on the other hand, is actuated by a gate signal 4 thereby to generate a first timing pulse having the same repetition period as $T_1$ of the first test data 711 and a second timing pulse 718 having a period equal to the repetition period $T_2$ of the second test data.

An amplitude signal proportional to the amplitude of the equalizer output generated by the envelope detection circuit 713 is applied to one input terminal of a differential amplifier 719 on the one had and to a first sample hold circuit 720 on the other. The first sample hold circuit 720 performs the sample hold operation by a first timing pulse 717 thereby to produce the amplitude of the first test data 711 as a reference voltage 721. This reference voltage 721 is applied to the other input terminal of the differential amplifier to detect the difference between the reference voltage 721 and the amplitude signal 714, which difference signal is produced as a signal 722 representing the frequency characteristic. In this manner, a signal 722 is generated which represents a frequency characteristic of a readout system approximate stepwise at two points including the frequencies of the first data and the second test data. The signal 722 thus representing the frequency characteristic is applied to a second sample hold circuit 723. The second sample hold circuit 723 performs the sample hold operation by a second timing pulse 718 and produces a voltage of the signal 722 representing the frequency characteristic associated with the second test data 712 as an error signal 724. This error signal 724 is applied to an input terminal of the differential amplifier 725, the other input of which is supplied with an output from the reference signal setting circuit 110. In this embodiment, the reference voltage is set in such a manner that a 0 volt signal is produced from the reference signal setting circuit. The output of the differential amplifier 725 is connected as an error value signal for equalization 6 to the equalizer controller 107 to produce an equalizer control signal 9. If the error value signal for equalization 6 is a positive voltage, it corresponds to class I in FIG. 7, indicating that a waveform occurs due to the large width of the isolated pulse waveform. In the process, the voltage magnitude indicates the degree to which the isolated pulse waveform expands. An equalizer control signal can thus be produced by use of a circuit having the same configuration as the equalizer controller shown in FIG. 8.

A well-known circuit may be used as an envelope detection circuit or other circuits making up the equalizer coefficient evaluation circuit 111. Also, another circuit configuration may be used if the circuit has the function to produce a signal representing the frequency characteristic.

The equalizer 9 used in this embodiment is a 5-tap transversal equalizer such as shown in FIG. 5.

Now, the manner in which the frequency of a test data is determined will be explained. As many test data frequency types as possible should preferably be used for evaluating the frequency characteristic of a readout system in order to secure accuracy of evaluation. In spite of this, a restriction is imposed by the need for narrowing of the region of a recording medium for recording actual data. Generally, in an ordinary ring-type ferrite magnetic head with windings of which the frequency characteristic tends to decrease in simple fashion, the frequency characteristic may be considered flat between a frequency point where the recorded data may be regarded as an isolated magnetization and another frequency point associated with the minimum bit interval of the system if the amplitude of the readout signal is made equal at these two points. As a consequence, a minimum of two types of test data frequencies serve the purpose. In the case where a thin film head is used, on the other hand, a peak is produced at a frequency determined by the thickness of a magnetic pole, resulting in a waveform having an undershoot. This causes an increased peak shift. To obviate this inconvenience, it is necessary to monitor the amplitude of a readout signal even at the peak frequency, so that it is desirable to use a test data for the peak frequency in addition to the two types of test data mentioned above.

What is claimed is:

1. A readout circuit in magnetic recording device comprising:
   a magnetic head for reading a read out signal from a recording medium on which there are recorded at least one of test data having positive and negative amplitudes which are determinable prior to reading data recorded on said recording medium, and test data resulting in a read out signal which becomes an isolated waveform,
   an equalizer for shaping said read out signal,
   means for detecting a difference between the absolute values of amplitudes of two portions of a waveform included in said read out signal shaped by said equalizer, and the distance between specified level points which are not zero in the waveform included in said read out signal,
   means for comparing a difference between the absolute values of the amplitudes of the two portions of the waveform detected by said detection means and a reference value, and said distance between said specified level points in the waveform and said reference value,
   means for operating said detection means and said comparing means during at least a period when said magnetic head reads out the test data,
   controller means for controlling said equalizer so that the difference between the absolute values of the amplitudes of two portions of the waveform detected by said detection means and the distance between the specified level points in the waveform are substantially consistent with said reference value,
   a pulse generator for forming a peak pulse from said read out signal shaped by said equalizer, and
   a data detection unit for forming data from the peak pulse formed by said pulse generator.

2. A readout circuit in a magnetic recording device according to claim 1, wherein said equalizer includes:
   a tap gain circuit for varying an attenuation factor and polarity of said read out signal;
   at least one delay circuit for varying a delay time of said read out signal;
   a tap gain controller for controlling a varying characteristic of the attenuation factor and polarity of said read out signal;

a delay time controller for controlling a delay characteristic of said at least one delay circuit; and said equalizer controller includes a memory for storing a control signal of said tap gain controller and said delay time controller.

3. A readout circuit in a magnetic recording device according to claim 2, further including a phase equalizer coupled to said equalizer for symmetrically shaping the waveform of said read out signal, said detection means detecting the distance between positive and negative peak level points of two adjacent portions of the waveform included in the read out signal shaped by said equalizer.

4. A readout circuit in a magnetic recording device according to claim 2, wherein said detection means detects the distance between more than two level points in the waveform included in said read out signal shaped by sad equalizer.

5. A readout circuit in a magnetic recording device according to claim 2, wherein said detection means detects the width of subsequent portions of the waveform from the center of the waveform at more than two level points in the waveform included in said read out signal shaped by said equalizer.

6. A read out circuit in a magnetic recording device according to claim 2, wherein said detection means detects the difference between the absolute values of the amplitudes of two waveforms having different frequencies included in said read out signal shaped by said equalizer.

7. A readout circuit in a magnetic recording device comprising;

a magnetic head for reading a read out signal from a recording medium on which there are recorded test data having positive and negative amplitudes which are determinable prior to reading data recorded on said recording medium;

an equalizer for shaping said read out signal;

means for detecting a difference between the absolute values of amplitudes of two adjacent positive and negative portions of a waveform included in said read out signal shaped by said equalizer, and the distance between peak level points in the waveform;

means for comparing a difference between the absolute values of the amplitudes of two positive and negative portions of the waveform detected by said detection means and a reference value, and the distance between peak level points in the waveform and said reference value;

means for operating said detection means and said comparing means during at least a period when said magnetic head reads out the test data;

controller means for controlling said equalizer so that the difference between the absolute values of the amplitudes of the two positive and negative portions of the waveform detected by said detection means and the distance between the peak level points in the waveform are substantially consistent with said reference value;

a pulse generator for forming a peak pulse from said read out signal shaped by said equalizer; and a data detection unit for forming data from the peak pulse formed by said pulse generator.

8. A readout circuit in a magnetic recording device according to claim 7, wherein said equalizer includes:

a tap gain circuit for varying an attenuation factor and polarity of said read out signal;

at least one delay circuit for varying a delay time of said read out signal;

a tap gain controller for controlling a varying characteristic of the attenuation factor and polarity of said read out signal;

a delay time controller for controlling a delay characteristic of said at least one delay circuit; and said equalizer controller includes a memory for storing a control signal of said tap gain controller and said delay time controller.

9. A readout circuit in a magnetic recording device according to claim 7, wherein said detection means includes:

a first gate circuit for fetching said read out signal at a front stage of said pulse generator;

a second gate circuit for fetching said peak pulse at a rear stage of said pulse generator;

a polarity selection circuit for discriminating the polarity of said read out signal fetched by said first gate circuit;

a positive peak value detection circuit for detecting the amplitude of a positive polarity waveform by using a signal from at least said second gate circuit and said polarity selection circuit as input signals;

a negative peak value detection circuit for detecting the amplitude of a negative polarity waveform by using a signal from at least said second gate circuit and said polarity selection circuit as input signals;

said comparing means including a voltage comparator for comparing an output of said positive peak value detection circuit with an output of said negative peak value detection circuit and for producing an error value signal for equalization; and said equalizer controller determines an equalizer parameter by using said error value signal for equalization as an input signal, said equalizer controller storing the most recent equalizer parameter determined and controlling said equalizer by utilizing said equalizer parameter.

10. A readout circuit in a magnetic recording device according to claim 7, wherein said detection means includes a time to voltage converter for detecting a time interval of the peak pulse from said pulse generator and for converting the time interval to a voltage signal, and said comparing means includes:

a setting circuit for outputting a standard value signal;

a comparator for comparing an output of said time to voltage converter with the standard value signal and for outputting an error value signal for equalization; and said equalizer controller determines an equalizer parameter by using said error value signal for equalization as an input signal, said equalizer controller storing the most recent equalizer parameter determined and controlling said equalizer by utilizing said equalizer parameter.

11. A readout circuit in a magnetic recording device according to claim 7, further including:

a variable frequency oscillator for producing a detection window based on the peak pulse generated by said pulse generator;

a detection circuit for forming a digital binary signal based on said peak pulse and said detection window;

a phase comparator for comparing the phase of the output of said variable frequency oscillator and the phase of output of said pulse generator to detect a phase shift;

means for feeding back a phase shift signal from said phase comparator to said voltage controlled oscillator; and means for outputting said phase shift signal to said equalizer controller.

12. A readout circuit in a magnetic recording device according to claim 7, wherein said detection means includes a peak to peak interval signal generator for converting a peak distance of said read out signal shaped by said equalizer to a high level signal of a logic circuit, and said comparing means includes:

a variable frequency oscillator for producing a detection window from said read out signal; and a level comparator for comparing the width of said high level signal with the detection window and for outputting a peak distance error signal.

13. A readout circuit in a magnetic recording device comprising:

a magnetic head for reading a read out signal from a recording medium on which there are recorded test data and actual data;

an equalizer for shaping said read out signal;

a detection means for detecting the a difference between the absolute values of amplitudes of a portion of a two waveform included in said read out signal of said test data shaped by said equalizer, and the distance between specified level points in the waveform which are not zero;

means for comparing a difference between the absolute values of the amplitudes of portions of the waveform detected by said detection means and a reference value, and the distance between the specified level points in the waveform and said reference value;

controller means for controlling said equalizer so that a difference between the absolute values of the amplitudes of two portions of the waveform detected by said detection means, and the distance between the specified level points in the waveform are substantially consistent with said reference value;

a pulse generator for forming a peak pulse from said read out signal shaped by said equalizer; and a data detection unit for forming data from the peak pulse formed by said pulse generator.

* * * * *